(12) United States Patent
Solomon

(10) Patent No.: US 10,647,214 B2
(45) Date of Patent: May 12, 2020

(54) GRANTING ELECTRIC VEHICLE OBJECT USE TO A THIRD PARTY ORGANIZATION

(71) Applicant: ChargePoint, Inc., Campbell, CA (US)

(72) Inventor: James Solomon, Saratoga, CA (US)

(73) Assignee: CHARGEPOINT, INC., Campbell, CA (US)

( * ) Notice: Subject to any disclaimer, the term of this patent is extended or adjusted under 35 U.S.C. 154(b) by 0 days.

(21) Appl. No.: 15/242,165

(22) Filed: Aug. 19, 2016

(65) Prior Publication Data
US 2017/0129349 A1 May 11, 2017

Related U.S. Application Data

(60) Provisional application No. 62/208,144, filed on Aug. 21, 2015.

(51) Int. Cl.
| | |
|---|---|
| *B60L 53/00* | (2019.01) |
| *G07C 9/00* | (2020.01) |
| *G06Q 10/06* | (2012.01) |
| *B60L 53/65* | (2019.01) |

(52) U.S. Cl.
CPC ............ *B60L 53/00* (2019.02); *B60L 53/65* (2019.02); *G06Q 10/06* (2013.01); *G07C 9/00015* (2013.01); *G07C 9/00103* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ............. B60L 11/1809; B60L 11/1824; B60L 11/1846; B60L 11/184; B60L 53/00; B60L 53/65; G07C 9/00015; G07C 9/00103; G06Q 10/06
See application file for complete search history.

(56) References Cited

U.S. PATENT DOCUMENTS

| | | | |
|---|---|---|---|
| 2011/0239116 A1* | 9/2011 | Turner | H02J 7/0027 715/705 |
| 2011/0276448 A1* | 11/2011 | Perper | G06Q 30/04 705/34 |
| 2013/0046660 A1* | 2/2013 | Lowenthal | G06Q 30/04 705/30 |
| 2013/0090936 A1* | 4/2013 | Solomon | G06Q 30/02 705/1.1 |
| 2013/0311658 A1* | 11/2013 | Solomon | G06Q 10/06 709/225 |
| 2014/0125279 A1* | 5/2014 | Juhasz | B60L 53/305 320/109 |
| 2014/0214459 A1* | 7/2014 | Ryder | G06Q 10/02 705/5 |

* cited by examiner

*Primary Examiner* — Thomas D Alunkal
(74) *Attorney, Agent, or Firm* — Nicholson De Vos Webster & Elliott LLP

(57) ABSTRACT

An electric vehicle operator group that includes multiple access identifiers associated with multiple EV operators of a first organization is created. Use of that group is granted to a second organization. The second organization adds the EV operator group to an access policy and applies the access policies to one or more electric vehicle charging stations owned or managed by the second organization. The first organization manages membership of the EV operator group.

18 Claims, 32 Drawing Sheets chargepoint

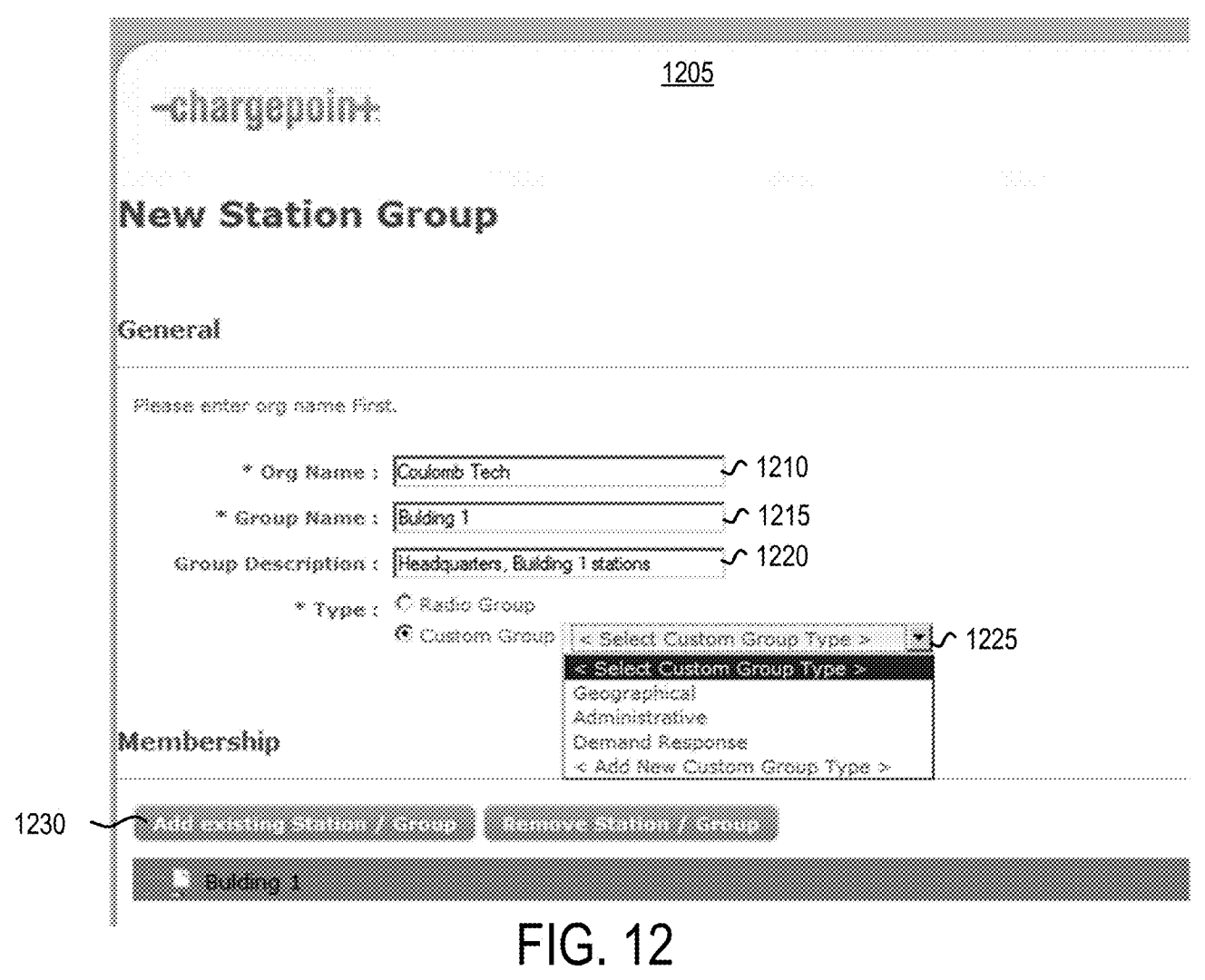

New Station Group

General

Please enter org name first.

* Org Name: Coulomb Tech — 1210
* Group Name: Building 1 — 1215
* Group Description: Headquarters, Building 1 stations — 1220
* Type: ○ Radio Group
  ● Custom Group < Select Custom Group Type >
< Select Custom Group Type > — 1225
Geographical
Administrative
Demand Response
< Add New Custom Group Type >

Membership

1230

● Building 1

FIG. 12

| CATEGORY / RIGHTS | NETWORK MANAGEMENT | STATION MANAGEMENT | STATION PARTNER | INSTALLATION | ENERGY MANAGEMENT | DETAILED USAGE ANALYSIS | SUMMARY USAGE ANALYSIS |
|---|---|---|---|---|---|---|---|
| MANAGE ORGANIZATION | ✓ | | | | | | |
| CONFIGURE STATIONS | ✓ | ✓ | | | | | |
| TROUBLESHOOT STATIONS | ✓ | ✓ | ✓ | | | | |
| PROVISION (ACTIVATE) STATIONS | ✓ | ✓ | | ✓ | | | |
| SUSPEND OR RESUME STATIONS (DR) | ✓ | | | | ✓ | | |
| DETAILED USAGE REPORTING | ✓ | ✓ | ✓ | ✓ | ✓ | ✓ | |
| SUMMARY USAGE REPORTING | ✓ | ✓ | ✓ | ✓ | ✓ | ✓ | ✓ |

GRANTING ELECTRIC VEHICLE OBJECT USE TO A THIRD PARTY ORGANIZATION

CROSS-REFERENCE TO RELATED APPLICATIONS

This application claims the benefit of U.S. Provisional Application No. 62/208,144, filed Aug. 21, 2015, which is hereby incorporated by reference.

FIELD

Embodiments of the invention relate to the field of electric vehicle charging; and more specifically, to granting electric vehicle object use to a third party organization.

BACKGROUND

Electric vehicle supply equipment (EVSE), commonly referred to as electric vehicle charging stations, are used to charge electric vehicles (e.g., electric battery powered vehicles, gasoline/electric battery powered vehicle hybrids, etc.). Electric vehicle charging stations are typically owned and/or operated by many different organizations. For example, organizations such as utilities, retail establishments, schools/universities, businesses, governments, may each own and/or operate electric vehicle charging stations. These electric vehicle charging stations may be available to be used by the public and/or restricted to being used by certain electric vehicle operators.

Organizations have traditionally had the ability to manage access to their charging stations by creating and maintaining an access control list (ACL) that lists the identifiers that are allowed to use their charging stations. However, this process is largely a manual process and as the number of electric vehicle operators of that organization increase, the burden on the administrator that is managing the access control list increases.

The electric vehicle charging stations may be networked with an electric vehicle charging service network that provides services and/or functionality to those charging stations. For example, the charging service network may provide configuration services, authorization services, billing services, usage reporting services, notification services, demand response services, etc. In traditional electric vehicle charging service networks, assigning privilege levels to administrators is very limited.

SUMMARY

A method and apparatus for connecting electric vehicle operators with organizations is described. In one embodiment, an organization (which may or may not own or operate electric vehicle charging stations) extends an affiliation offer to one or more electric vehicle operators. The affiliation offer communicates a set of one or more benefits for the electric vehicle operators upon accepting the affiliation offer. Example benefits include access benefits (e.g., authorization to use charging station(s) belonging to that organization), preferred pricing to charging station(s) belonging to that organization, coupons, deals (e.g., reduced rates for goods or services), etc. The affiliation offer also communicates a set of one or more conditions for acceptance of the offer. Example conditions include providing or allowing contact information of the electric vehicle operator including one or more of the vehicle operator's name, mailing address, phone number, email address, etc., to be shared with the organization, and allowing the organization to use that contact information. For example, the organization may use that information for marketing purposes (e.g., to send advertisements, offers, coupons, etc.). As another example, the organization may use the vehicle operator's contact information for administrative purposes to add the electric vehicle operator to an access control list (ACL) group and/or to a preferred pricing group. Another example condition is allowing the organization to view the electric vehicle operator's charging habits (e.g., location of charging, duration of charging, frequency of charging, amount of charge transferred (over a certain period of time), etc.). As yet another example, a utility organization may provide a reduced rate for charging service to those electric vehicle operators that affiliate with the utility and agree to their charging being load shed in cases of high demand.

In one embodiment, the affiliation offer is extended only after receiving a secret affiliation code from the electric vehicle operator and determining that the received secret affiliation code is valid and corresponds with the affiliation offer.

An acceptance of the affiliation offer is received from an electric vehicle operator, where the acceptance includes an identifier associated with that electric vehicle operator. Responsive to verifying that the electric vehicle operator is allowed to be affiliated with the organization, the electric vehicle operator is associated with the organization to provide the set of benefits.

In some embodiments, a group of electric vehicle charging objects is created including receiving input from an organization to group a selected set of electric vehicle charging objects, creating the group in response to the received input, where the created group includes as its members the selected set of electric vehicle charging objects, and performing a set of acts for the members of the group as a whole. In some embodiments, an organization may grant a set of rights over a group of electric vehicle charging objects to other organizations.

In an embodiment, an electric vehicle operator group that includes multiple access identifiers associated with multiple EV operators of a first organization is created. Use of that group is granted to a second organization. The second organization adds the EV operator group to an access policy and applies the access policies to one or more electric vehicle charging stations owned or managed by the second organization. The first organization manages membership of the EV operator group.

BRIEF DESCRIPTION OF THE DRAWINGS

The invention may best be understood by referring to the following description and accompanying drawings that are used to illustrate embodiments of the invention. In the drawings:

FIG. 12 is an exemplary interface to the group creation module that allows organizations to create custom groups of electric vehicle charging objects according to one embodiment;

FIG. 21 illustrates exemplary packages of pre-defined rights according to one embodiment;

FIG. 23 illustrates an alternative exemplary interface to the affiliation definition module of FIG. 1 that allows organizations to define an affiliation group and indicate whether the affiliation offer will be visible to all electric vehicle operators or only those operators that enter in a secret affiliation code according to one embodiment;

DESCRIPTION OF EMBODIMENTS

Figure 1:
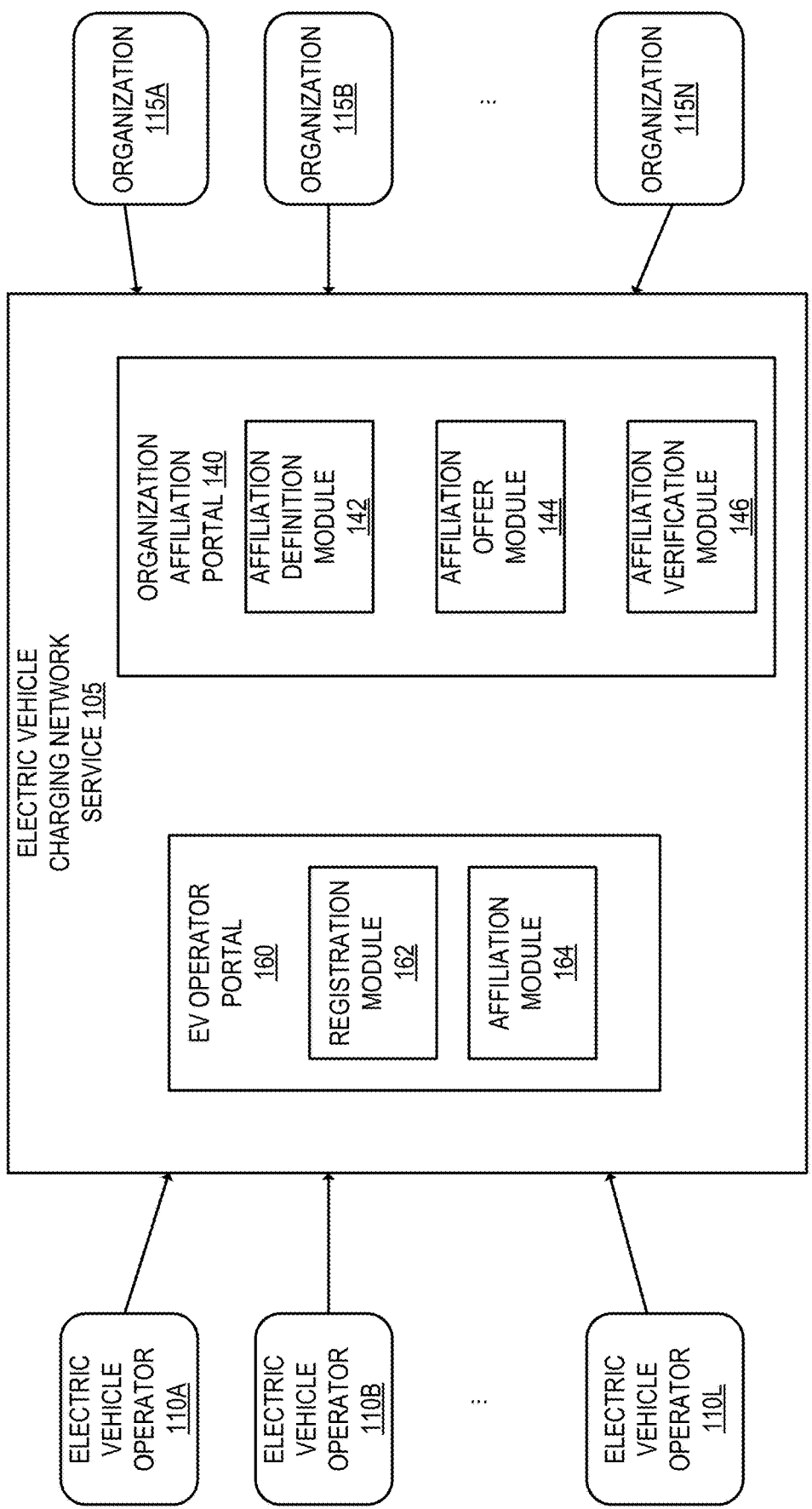
FIG. 1 illustrates an exemplary network for connecting electric vehicle operators with organizations according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the term "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for connecting electric vehicle operators with organizations is described. In one embodiment, an organization (which may or may not own or operate electric vehicle charging stations) extends an affiliation offer to one or more electric vehicle operators. The affiliation offer communicates a set of one or more benefits for the electric vehicle operators upon accepting the affiliation offer. Example benefits include access benefits (e.g., authorization to use charging station(s) belonging to that organization), preferred pricing to charging station(s) belonging to that organization, coupons, deals (e.g., reduced rates for goods or services), etc. The affiliation offer also communicates a set of one or more conditions for acceptance of the offer. Example conditions include providing or allowing contact information of the electric vehicle operator including one or more of the vehicle operator's name, mailing address, phone number, email address, etc., to be shared with the organization, and allowing the organization to use that contact information. For example, the organization may use that information for marketing purposes (e.g., to send advertisements, offers, coupons, etc.). As another example, the organization may use the vehicle operator's contact information for administrative purposes to add the electric vehicle operator to an access control list (ACL) group and/or to a preferred pricing group. Another example condition is allowing the organization to view the electric vehicle operator's charging habits (e.g., location of charging, duration of charging, frequency of charging, amount of charge transferred (over a certain period of time), etc.). As yet another example, a utility organization may provide a reduced rate for charging service to those electric vehicle operators that affiliate with the utility and agree to their charging being load shed in cases of high demand.

A method and apparatus for a flexible administrative model in an electric vehicle charging service network is also described. In one embodiment, the flexible administrative model allows organizations to group electric vehicle ("EV") charging objects (e.g., EV charging stations, EV operators, EVs, administrators, etc.) such that certain actions may be performed on those charging objects at a group level. In one embodiment, the flexible administrative model allows an organization to grant rights over a group of EV charging object(s) to different organizations.

FIG. 1 illustrates an exemplary network for connecting electric vehicle operators with organizations according to one embodiment. The electric vehicle charging network service 105 is coupled with the electric vehicle operators 110A-110L, which each operate (e.g., own, drive, etc.) one or more electric vehicles. The charging service network 105 is also coupled with the organizations 115A-115N. An organization is an entity that is associated with the electric vehicle charging service network. Example organizations include charging station owners, charging station distributors, charging station installers, charging station maintenance companies, utility grids, EV fleets, and the charging service network itself. An organization may or may not own, control, or manage charging stations that are configured on the charging service network. For example, an organization 115 may have one or more charging stations (which it may or may not own) installed on its premises. As another example, an organization 115 may own or control charging stations that are not installed on its premises. Of course these are examples of organizations and there may be different organizations that may use the flexible administrative model described herein. Organizations may be represented within the charging network service as organization containers.

Each organization may be associated with a number of entities of the electric vehicle charging network service including, for example, charging stations, administrators, electric vehicles, and electric vehicle operators. These entities may be represented as EV charging objects in the charging network service.

The electric vehicle charging network service 105 may be coupled with charging stations that are operated by at least some of the organizations 115A-115N. For example, the electric vehicle charging network service 105 may provide configuration services, authorization services, billing services, notification services, etc., for charging stations. Also, as will be described in greater detail later herein, the electric vehicle charging network service 105 provides affiliation services that allow the organizations 115A-115N to connect with electric vehicle operators. Also, in some embodiments, the electric vehicle charging network service 105 allows organizations to group electric vehicle charging objects (e.g., charging stations, electric vehicle operators, electric vehicles, administrators, etc.) such that certain actions may be performed on those charging objects at a group level. In some embodiments, the electric vehicle charging network service 105 allows an organization to grant rights over a group of EV charging objects to different organizations.

The electric vehicle charging network service 105 may allow organizations (at least those organizations that control charging stations) to configure their charging stations. For example, they may use the service 105 to add charging stations to the network, manage access control lists (ACLs) (which indicate whether an electric vehicle operator is authorized to use a particular charging station), and/or manage pricing groups (a pricing group indicates a collection of one or more electric vehicle operators that may or may not get a preferential price compared to other groups of operators).

The electric vehicle charging network service 105 may provide authorization services. By way of example, an electric vehicle operator may request charging service of an electric vehicle charging station. The request may include an identifier, which is referred herein as the access identifier. The access identifier may be assigned by the service 105 in some embodiments, and in other embodiments it may be assigned by one of the organizations 115A-115N. For example, the access identifier may be a Radio Frequency Identification (RFID) identifier that is on a smartcard or other RFID enabled device that is assigned and disseminated by the service 105. As another example, the access identifier may be another identifier (e.g., a corporate identifier that may be in a corporate badge). The access identifier may also be an email address, phone number, username, or other identifier suitable for uniquely identifying the electric vehicle operator. In some embodiments, an electric vehicle operator may be associated with multiple access identifiers.

The electric vehicle charging network service 105 may process that request including determining whether the electric vehicle operator is authorized to use that charging station at the time of the request. If the electric vehicle operator is authorized, the electric vehicle charging network service 105 may transmit a response to that charging station that indicates that charging is allowed, and the charging station allows charging to proceed. If the electric vehicle operator is not authorized, the electric vehicle charging network service 105 may transmit a message to the charging station that indicates that charging is not allowed, and the charging station may not allow charging to proceed.

Although not illustrated in FIG. 1, the electric vehicle charging network service 105 may allow those organizations that own or administer charging stations to configure one or more ACL groups for their charging stations that defines who, and possibly at what time/date, can use their charging stations. For example, an employee only ACL group may be defined during work hours such that only employees may use the charging stations during work hours. Different ACL groups may be applied to different charging stations. Also, the electric vehicle charging network service 105 may allow those organizations that own or administer charging stations to configure one or more pricing groups for their charging stations that defines the price for charging service.

The electric vehicle charging network service 105 may also periodically receive charging information from the charging stations (e.g., amount of energy being consumed by an electric vehicle, amount of energy transferred by an electric vehicle to a grid in a vehicle to grid (V2G) scenario, etc.).

In one embodiment, the charging network service 105 provides demand response services for charging stations such that during a demand response event (e.g., during high periods of demand), the charging network service 105 can cause certain charging stations to stop supplying energy, prevent certain charging stations from supplying energy, and/or reduce the amount of energy that certain charging stations may supply.

As described above, the electric vehicle charging network service 105 provides affiliation services that allow one or more of the electric vehicle operators 110A-110L to affiliate with one or more of the organizations 115A-115N (or vice versa). An affiliation between an organization and an electric vehicle operator provides benefit(s) to that electric vehicle operator (e.g., authorization to use charging station(s) belonging to that organization, preferred pricing to charging service provided by that organization, coupons, advertisements, etc.), typically in exchange for the electric vehicle operator allowing information to be shared with the organization (e.g., the electric vehicle operator's contact information, a charging history of the electric vehicle operator, etc.).

The electric vehicle charging network service 105 includes the organization affiliation portal 140 that allows an organization 115 to define an affiliation. For example, the affiliation definition module 142 is configured to allow an organization 115 to indicate the benefits of the affiliation, the conditions of the affiliation, a verification field for the affiliation, the date/time the affiliation benefits apply, the duration of the affiliation (e.g., daily, weekly, indefinite, etc.), and/or who (or what class of operators) can accept the offer.

The benefits may be related to charging service such as access to use the charging stations belonging to the organization, preferred pricing to use the charging stations to that organization, etc. There may also be benefits that are not related to charging service such as providing coupons (which may be coupons for services/goods provided by the organization and/or third party coupons for services/goods provided by other entities), deals, advertisements, etc.

The conditions of the affiliation may specify what the electric vehicle operator exchanges for the benefit(s). For example, as a condition of the affiliation, the operator may be required to share its contact information (e.g., one or more of its name, mailing address, email address, phone number) with the organization and agree that the organization may use that contact information. For example, the organization may use that contact information for marketing purposes such as sending advertisements to the electric vehicle operator, etc.

The affiliation offer may also require the driver to provide an identification value that is used for verifying the identity of the electric vehicle operator. For example, in the case that the organization is an employer and the affiliation offer is valid only to employees, the electric vehicle operator may be required to provide their employee number. As another example, in the case that the organization is a retail establishment with a loyalty program and the affiliation offer is valid to members only, the electric vehicle operator may be required to provide their loyalty program member number.

The organization may specify who can be a member of the affiliation group. For example, an organization that is an employer may configure an affiliation group that is restricted to employees only. As another example, an organization that is a retailer may configure an affiliation group that is restricted to reward card members only.

In some embodiments, an organization may configure how the affiliation offers are extended to electric vehicle operator(s). For example, an affiliation offer may be extended through an invitation process where only certain electric vehicle operator(s) may receive the offer. For example, an organization is an employer may extend the affiliation offer to their employees only. As another example, an affiliation offer may be extended publicly through the organization affiliation portal 140.

Figure 2:
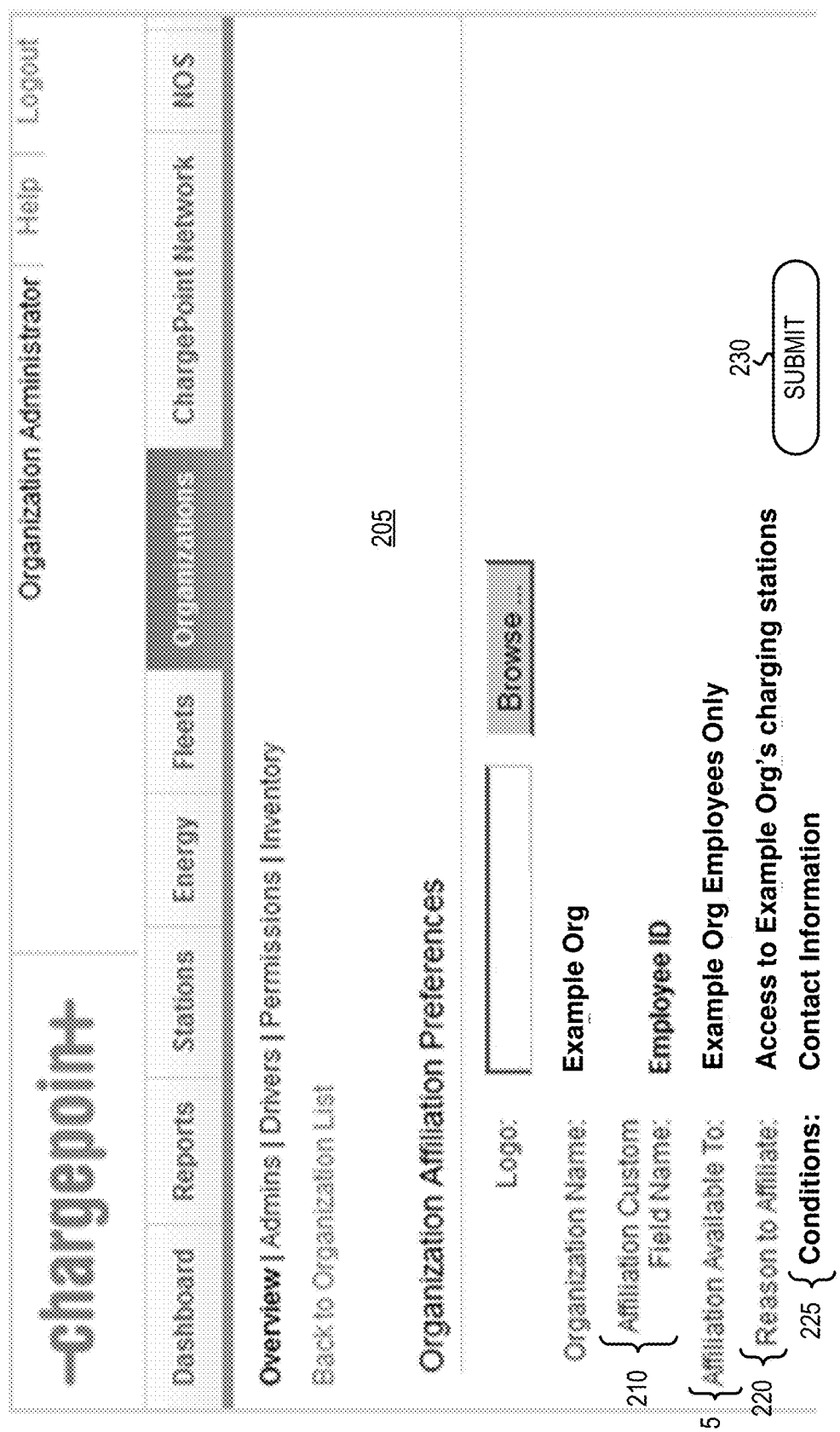
FIG. 2 illustrates an exemplary interface to the affiliation definition module of FIG. 1 that allows organizations to define an affiliation group according to one embodiment.

FIG. 2 illustrates an exemplary interface to the affiliation definition module 142 that allows organizations to define an affiliation group according to one embodiment. In one embodiment, the affiliation definition interface 205 is a website that is available through the electric vehicle charging network service 105. In some embodiments, the affiliation definition interface 205 is available only to organizations that are registered with the charging network service 105. In some embodiments, the affiliation definition interface 205 (as well as other aspects of affiliation) are available only to those organizations that have purchased a package that includes affiliations (that is, in these embodiments the service 105 may require organizations to pay a fee for the ability to provide affiliations).

The affiliation definition interface 205 allows organizations to define an affiliation group. As illustrated in FIG. 2, the organization may specify the affiliation custom field name 210, which defines the value that the electric vehicle operator specifies and is used during a verification process (this field is sometimes referred herein as the verification field). In the example illustrated in FIG. 2, the affiliation custom field name 210 is set as the employee identifier. Thus, when an offer is extended to an electric vehicle operator, the electric vehicle operator will be asked to provide their employee number. Other examples include a university or school requiring a student identification number, a loyalty program (e.g., hospitality, travel) requiring a frequent flier or rewards program identifier, a retailer requiring a rewards program number, and a utility requiring an account number. It should be understood that these are examples, and the organizations may define different ways of identifying the electric vehicle operators. In addition, other embodiments may provide mechanisms for organizations to request more than one verification field.

The organization may also specify who the affiliation is available to using the field 215. In the example illustrated in FIG. 2, the field 215 indicates that the affiliation is available to the employees of the organization only. In one embodiment, the information supplied in the field 215 is used at least in part when restricting who can view the affiliation offer. For example, the organization may provide the service 105 with a list of their employees (e.g., through web services) along with their matching verification identifiers. The service 105 may extend the offer to only those electric vehicle operators that are included on the employee list and that input a valid verification identifier. As another example, the service 105 may prompt the vehicle operator to input their verification identifier (e.g., an employee identifier) and transmit a query to the organization (e.g., through web services) that includes the name of the electric vehicle operator and the verification identifier that was input. The organization may return a message that indicates whether the operator is allowed to view their offer.

The organization may also specify the benefits to the affiliation using the reason to affiliate field 220. In one embodiment, the benefits included in the field 220 are communicated to the electric vehicle operators when the affiliation offer is extended. In one embodiment, the information supplied in the field 220 may be used by the service 105 when applying the benefit of the affiliation group. For example, in a case where the benefit is charging service related, the service 105 may automatically confer that benefit upon acceptance of the offer and verification of the electric vehicle operator. In the example illustrated in FIG. 2, the reason to affiliate field 220 indicates that affiliation will provide the benefit of access to use the organization's charging stations (use of those charging stations may be restricted to only operators that are affiliated).

The organization may also specify the conditions of the affiliation using the conditions field 225. The conditions are communicated to the electric vehicle operators when the affiliation offer is extended.

The organization may submit the affiliation using the submit button 230. Although FIG. 2 illustrates several different parameters for configuring affiliations, it should be understood that FIG. 2 is an example and affiliations may be configured with more parameters, less parameters, or different parameters. In some embodiments, organizations may define multiple affiliation groups where each group may have different benefits, conditions, etc.

In some embodiments, the organization may notify electric vehicle operators of outstanding affiliation offers using external mechanisms. For example, the organization may send an email to electric vehicle operators that indicates that there is an outstanding affiliation offer. By way of a specific example, an employer may extend an affiliation offer to their employees by sending the offer to their work email address. In such a case, the email may include a link to the electric vehicle operator portal 160 where the operator may register for an account with the service 105 (if they do not already have an account) and view and accept the affiliation offer. As another example, an email may include a link that when selected, automatically causes an account to be created with the service 105 and the affiliation offer to be accepted.

In other embodiments, the affiliation offers may be extended using mechanisms that are internal to the service 105. For example, the affiliation offer module 144 may cause the affiliation offer to be extended to particular electric vehicle operators using an automatic popup and/or internal messaging system such that when the electric vehicle operator logs into their account on the service 105, the affiliation offer is displayed. As another example, the affiliation offer module 144 may cause an email to be generated to those electric vehicle operators that qualify for acceptance into a particular affiliation group (the email may include a link to the portal 160 so that the operator may view and accept the offer). The terms of the offer (including benefits and acceptance conditions) may be included in the email and replying to the email, or selecting a link included in the email, may cause the offer to be accepted.

In some embodiments, affiliation offers are directed to specific electric vehicle operators (e.g., offers that are extended to employees only). Typically, in these embodiments, a previous relationship exists between the organization and the electric vehicle operator.

In other embodiments, affiliation offers are made more generally to the public, where a previous relationship may or may not exist. For example, an organization may use the affiliation offer module 144 to publish their affiliation offer(s) generally to all electric vehicle operators (that is, any electric vehicle operator may view the affiliation offer and potentially affiliate with that organization). As another example, an organization may use the affiliation offer module 144 to publish their affiliation offer(s) to a pre-defined group of electric vehicle operator(s). An example of a pre-defined group includes those electric vehicle operator(s) that are located in a certain geographic area. Another example of a pre-defined group includes those electric vehicle operator(s) that are in a certain demographic (e.g., age, gender, electric vehicle type, etc.). By way of example, an organization that has a physical presence in only a certain region of the country may only desire to publish their affiliation in that region of the country.

Figure 3:
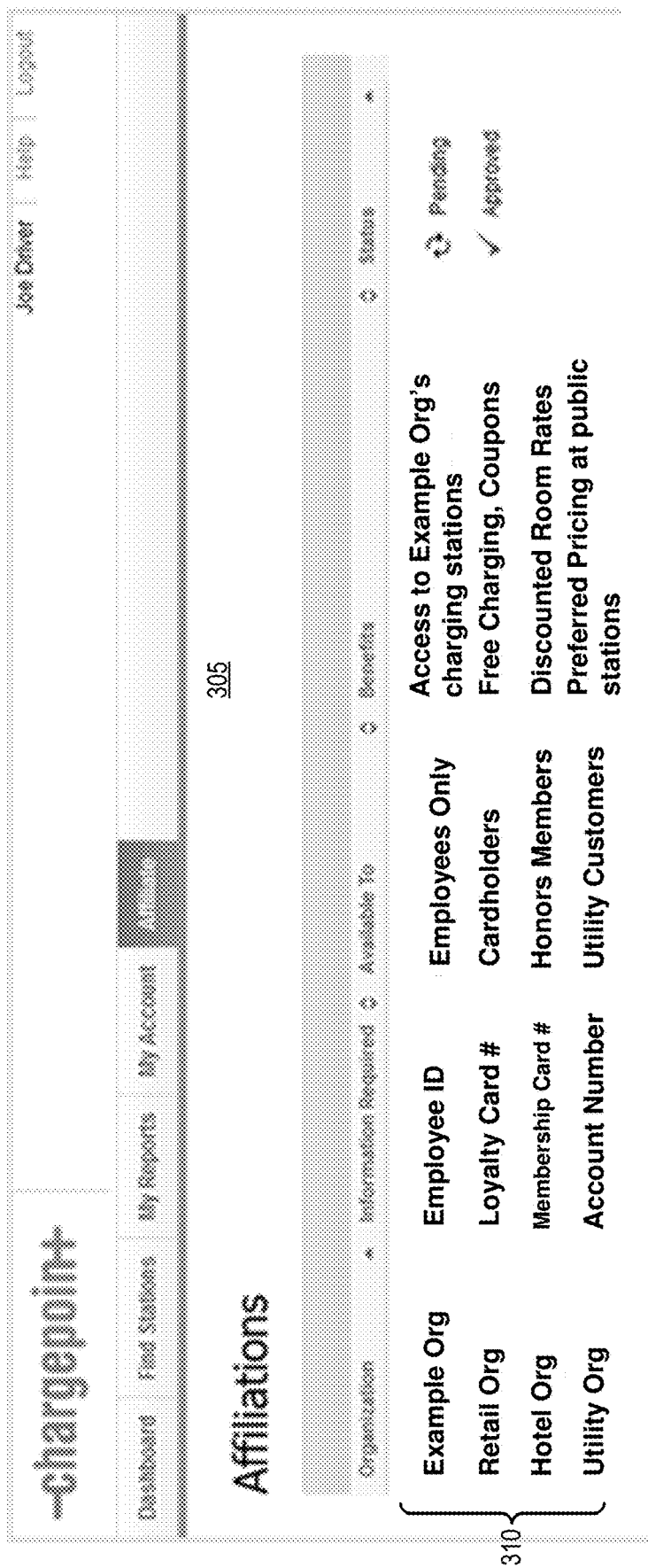
FIG. 3 illustrates an exemplary interface of the affiliation module of FIG. 1 that allows electric vehicle operators to view and accept affiliation offers according to one embodiment.

The electric vehicle operators may use the affiliation module 164 of the electric vehicle operator portal 160 to view and accept the affiliation offers. FIG. 3 illustrates an exemplary interface 305 of the affiliation module 164 that allows electric vehicle operators to view and accept affiliation offers according to one embodiment. While in one embodiment the affiliation interface 305 is a website that is available through the electric vehicle charging network service 105, in other embodiments the affiliation interface 305 (or an interface equivalent to the interface 305) is available through an application on a mobile device (e.g., a smartphone, a tablet, a notebook, etc.), via an in dash navigation system, via an application available through a social media portal, or through a display of a charging station.

In some embodiments, the interface 305 is available only to electric vehicle operators that are registered with the charging network service 105. In one embodiment, electric vehicle operators can use the registration module 162 to register for service with the service 105. Registering for service may include providing personal contact information (e.g., name, mailing address, email address, phone number, etc.) and may also include providing payment information.

The affiliations interface 305 displays a number of affiliation offers that are extended to the vehicle operator. As illustrated in FIG. 3, the interface 305 shows the organization that extended the affiliation offer, the information required for verification (e.g., employee identifier, loyalty card number, membership card number, account number), who the affiliation is available to (e.g., employees only, cardholders, honors members, utility customers), the benefits provided by the affiliation (e.g., access to charging stations, free charging, discounted room rates, preferred pricing at public stations), and the status of the offers (e.g., pending, approved, denied). The interface 305 shows a summary of the affiliation offers. To view further details, the interface 305 includes a link for each offer to view the offer in more details and to accept or deny the offer. For example, each of the organizations 310 includes a link, that when selected, causes more details regarding the offer to be displayed and allows the offer to be accepted.

Figure 4:
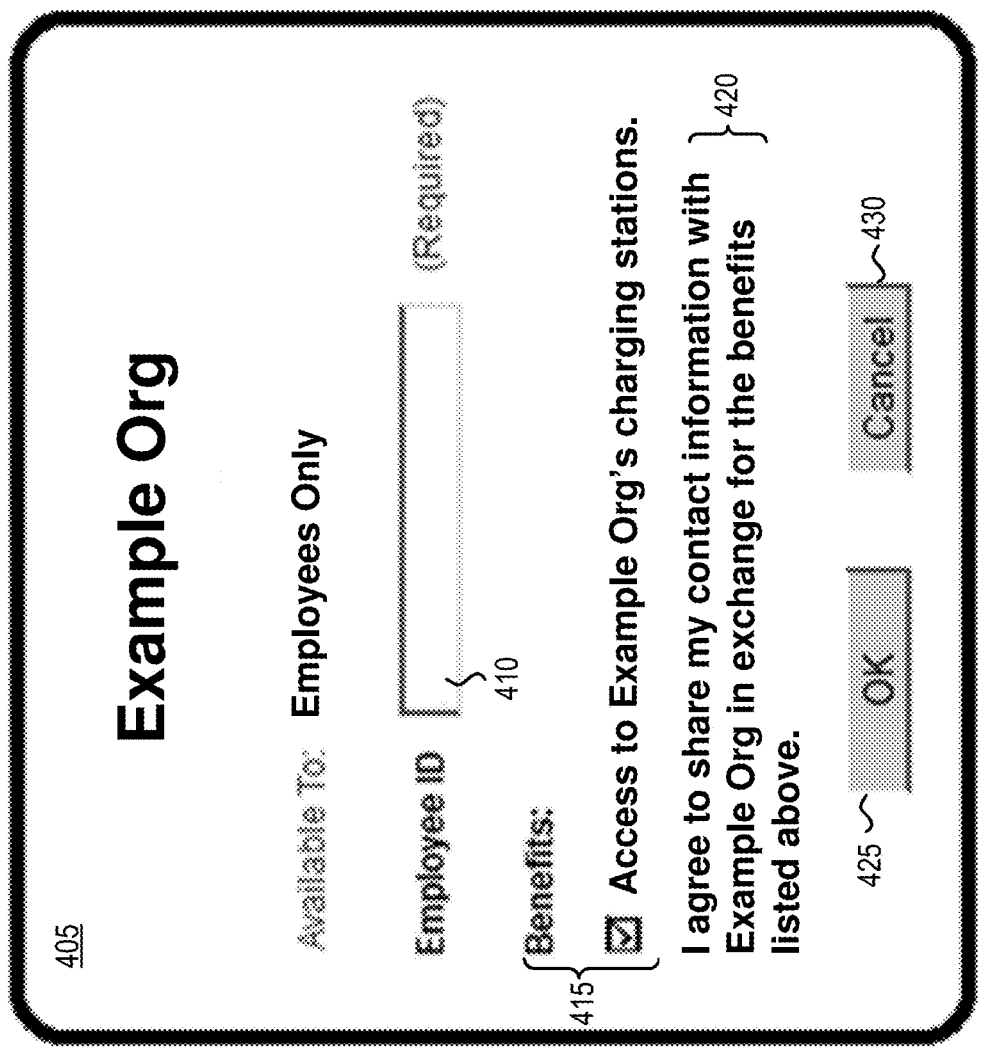
FIG. 4 illustrates an example of an affiliation offer that is displayed (e.g., in response to an electric vehicle operator selecting a link for an offer in the interface illustrated in FIG. 3), according to one embodiment.

FIG. 4 illustrates an example of an affiliation offer that is displayed (e.g., in response to an electric vehicle operator selecting a link for an offer in the interface 305). The affiliation offer 405 indicates that the offer is available to employees only (employees of the example organization) and requires the operator to provide their employee identifier in the field 410. As described previously, the requirement for the employee identifier may have been configured by the organization through use of the field 210 of the interface 205. The affiliation offer 405 also displays the benefits 415 of the offer, which in this example is access to the charging stations belonging to the organization. The affiliation offer 405 also displays the conditions 420 of the offer, which in this case is an agreement for the operator to share contact information (e.g., name, mailing address, email address, phone number, etc.) with the organization. The operator may accept the offer 405 by selecting the button 425 and may reject the offer 405 by selecting the button 430. Although not illustrated in FIG. 4, in some embodiments the offer also includes a link to view the terms of the offer in more details, which may include, for this example, how the contact information of the operator will be used.

In some embodiments, an accepted affiliation offer must be verified prior to it taking effect. In some embodiments, the verification is manually performed by an administrator of the organization. For example, in these embodiments, the administrator may use the affiliation verification module 146 to view those offers that have been accepted by electric vehicle operators, including any required information (e.g., the information in the verification field) and they may either confirm or reject the acceptance of the offer. If the acceptance is rejected, the administrator may provide a reason for the rejection (e.g., an invalid employee identifier was provided). The reason for rejection may be communicated to the electric vehicle operator (e.g., by email, text message) and/or included in the status field displayed in the affiliations interface 305.

Although not illustrated in FIG. 4, in some embodiments, the offer may include a menu of benefits that may each have different terms and may be individually accepted by the electric vehicle operator. For example, an organization may offer free charging at its charging stations in return for use of an electric vehicle operator's email address and may offer a free beverage on plug-in to an electric vehicle operator in return for allowing the organization to view the charging information of that electric vehicle operator (e.g., one or more of the following: the location of charging, duration of charging, frequency of charging, amount of charge transferred (over a certain period of time), etc.).

Figure 6:
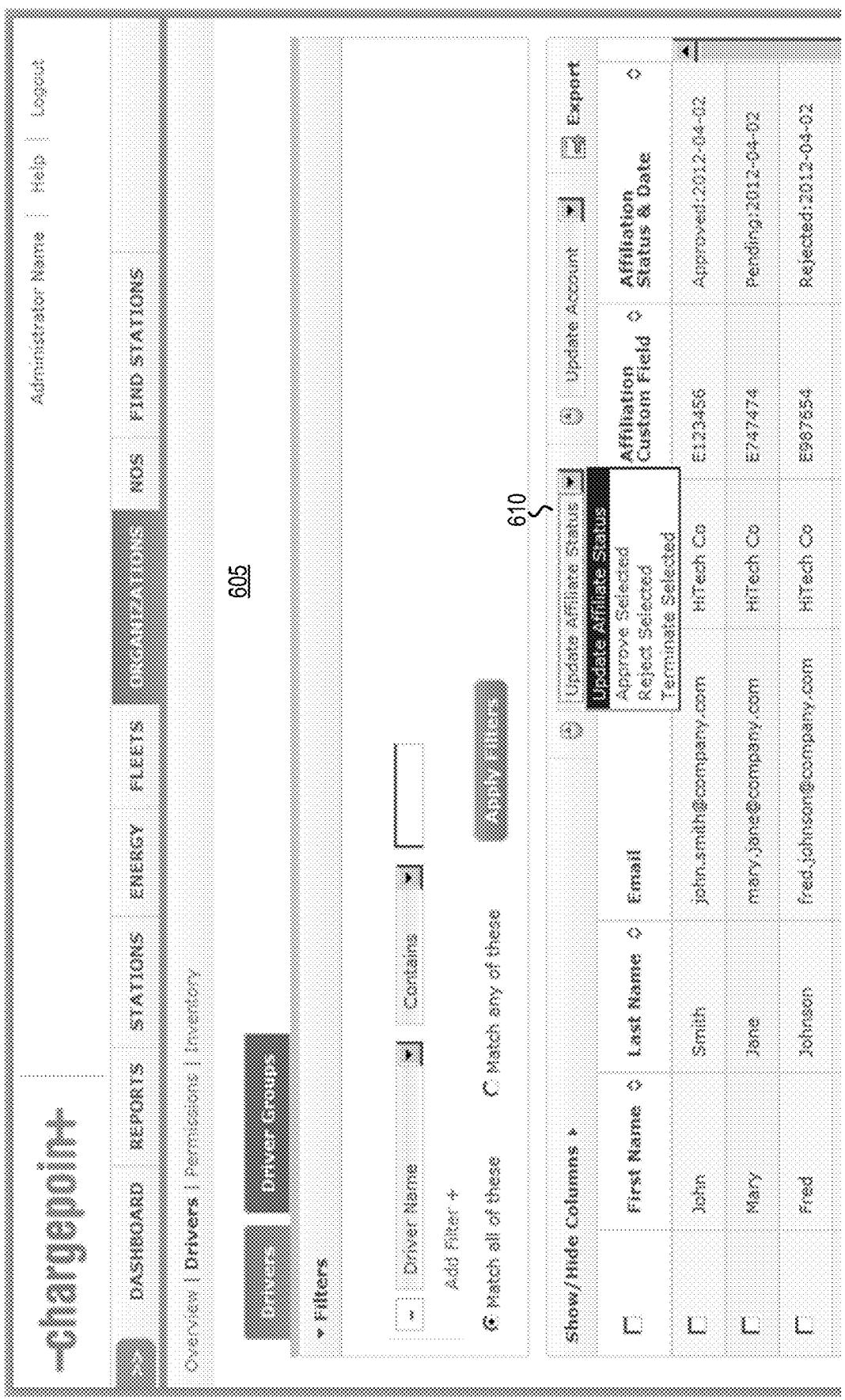
FIG. 6 illustrates an exemplary interface to the affiliation verification module illustrated in FIG. 1 according to one embodiment.

FIG. 6 illustrates an exemplary interface 605 to the affiliation verification module 146 according to one embodiment. As illustrated in FIG. 6, the interface 605 can list the affiliation acceptances that have been received by the service 105. In the example illustrated in FIG. 6, the interface 605 displays a record for affiliation acceptances that have been received. Each record includes a name, an email address, an organization identifier, an affiliation custom field identifier (referred herein as a verification identifier), and a status of the affiliation (whether it has been approved, rejected, or is pending). Of course, it should be understood that the interface 605 is an example and more fields, less fields, and/or different fields, may be displayed in some embodiments. The organization's administrator may use the interface 605 to approve an affiliation. For example, the administrator may compare the identifier provided by an electric vehicle operator (and optionally the name and/or email address provided by the electric vehicle operator) with a known list of the identifiers (and optionally names and/or email addresses) in one embodiment. For example, if employee identifiers are used as the identifier, the administrator may compare the identifiers with a list of the employee identifiers to verify the identity of the employee. The administrator may mark one or more of the entries and select an entry from the drop-down list 610 to approve the selected entries or reject the selected entries.

In other embodiments, the verification is automatically performed (e.g., without an administrator comparing identifiers). For example, in such embodiments, the organization uploads the credentials of those electric vehicle operators that are allowed to be affiliated (e.g., the verification identifier). The affiliation verification module 146 may then automatically verify the identity of the electric vehicle operator using the stored credentials (e.g., by comparing the identifier included in the acceptance of the offer with the stored identifiers).

In some embodiments, after a certain number of times an affiliation is denied to an electric vehicle operator (e.g., after the denial of affiliation exceeds a threshold), that electric vehicle operator may be blacklisted for that organization.

As previously described, in some embodiments, after an affiliation offer is accepted (and possibly after the identity of the electric vehicle operator is verified), the service 105 automatically confers the benefit for the electric vehicle operator. For example, if the benefit is to allow the electric vehicle operator to use the charging stations that belong to that organization, in one embodiment that operator is added to a group of operators that are allowed to use those charging stations (e.g., added to a whitelist ACL that is applied to those charging stations). As another example, if the benefit is to provide preferred pricing for charging stations that belong to that organization, in one embodiment, the operator is added to a preferred pricing group.

In some embodiments, the administrator of an organization may view a list of electric vehicle operators that have successfully affiliated with the organization. The administrator may manually add one or more of those electric vehicle operators to any created operator groups (e.g., ACL groups, pricing groups, etc.) by selecting them from the list and adding them to the group.

In some embodiments, the affiliation group provides an indirection that allows the service 105 to automatically update an ACL group and/or pricing group (or other grouping of electric vehicle operators that are treated the same by the service 105 for a particular reason) if an electric vehicle operator adds, removes, or changes their access identifier to their account. For example, an electric vehicle operator identifier (e.g., the name of the electric vehicle operator, a unique account number, the affiliation identifier, or some combination) that identifies the electric vehicle operator, and is associated with the access identifier(s) for that electric vehicle operator identifier, may be used when associating the operator with an ACL group, a pricing group, and/or any other group where electric vehicle operators are treated the same by the service 105 for a particular reason. By way of example, consider an electric vehicle operator whose electric vehicle operator identifier is "Jim" and has a set of access identifiers of 111 and 222 associated with his account. If "Jim" is affiliated with his employer's organization ("Employer Org"), and "Jim" is added to an employees ACL, then the service 105 automatically and transparently adds the set of access identifiers (111 and 222) to that employees ACL. If Jim changes an access identifier (e.g., the access identifier 111 is an RFID tag that Jim lost and is replaced with the access identifier 333), then the service 105 automatically and transparently removes the access identifier 111 from the employees ACL and replaces it with the access identifier 333 (assuming that the service 105 is aware that the access identifier 111 is removed and the access identifier 333 is added, for example, by the electric vehicle operator logging into his account and replacing identifier 111 with identifier 333).

Figure 5:
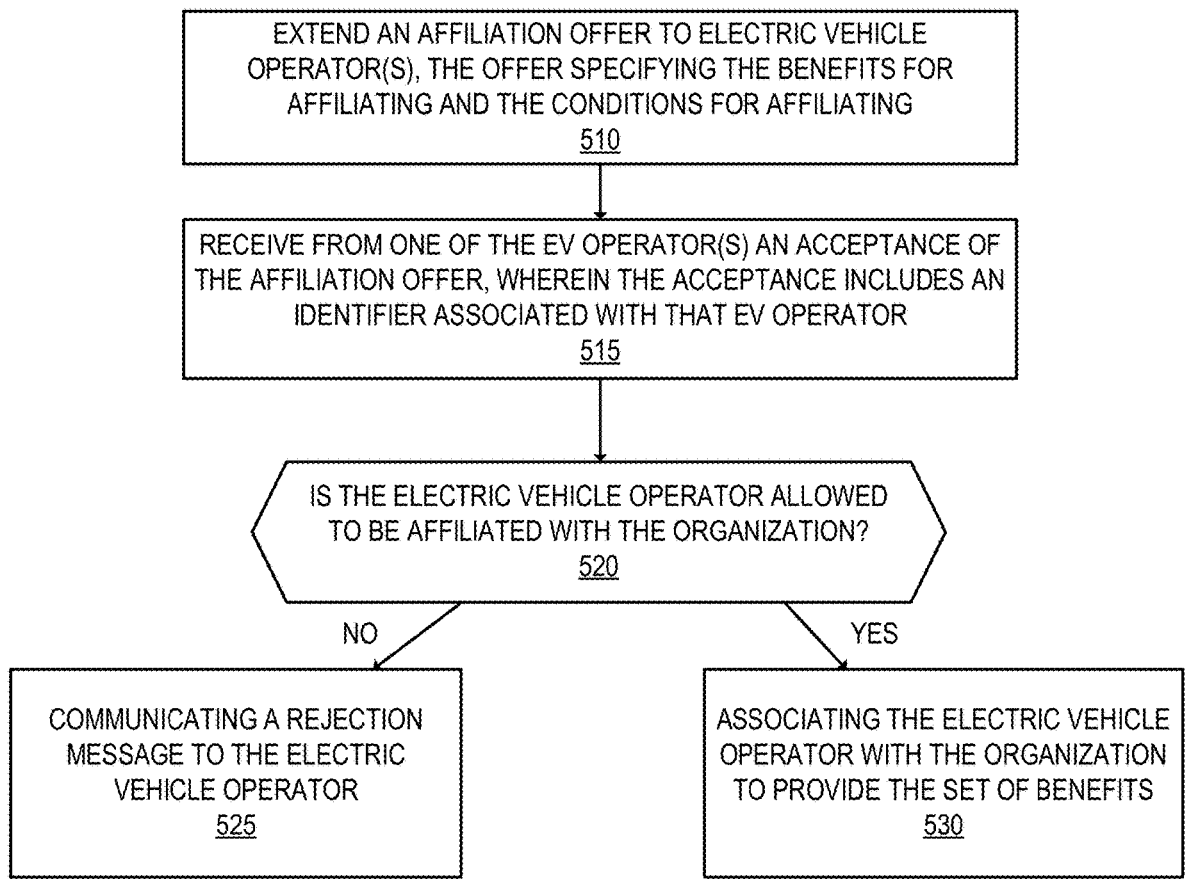
FIG. 5 is a flow diagram that illustrates exemplary operations for connecting electric vehicle operators with organizations according to one embodiment.

FIG. 5 is a flow diagram that illustrates exemplary operations for connecting electric vehicle operators with organizations according to one embodiment. In one embodiment, the operations described in FIG. 5 are performed by one or more servers of the service 105.

At operation 510, an affiliation offer is extended to one or more electric vehicle operators. The affiliation offer specifies a set of one or more benefits that will be provided to an electric vehicle operator that accepts the offer and also includes a set of one or more conditions that the electric vehicle operator must accept. The affiliation offer may also specify one or more identifier types that the electric vehicle operator is required to include in their acceptance. These identifier(s) may be used to verify the identifier of the electric vehicle operator.

The set of benefits may be related to charging electric vehicles (e.g., the ability to use charging station(s) belonging to that organization, preferred pricing (or free) for use of charging station(s) belonging to that organization, etc.) and/or not directly related to charging electric vehicles (e.g., coupons, deals (e.g., reduced rates for goods or services), advertisements, etc.).

The set of conditions may include allowing contact information and/or charging information to be shared with the organization. The contact information may include one or more of the following: the vehicle operator's name, mailing address, phone number, email address, etc. The charging information may include one or more of the following: the location of charging, duration of charging, frequency of charging, amount of charge transferred (over a certain period of time), etc. The set of conditions may also include other items such as agreeing to having their charging being load shed during high periods of demand, allowing their charging to be interrupted (e.g., if a higher priority operator wants to charge), etc.

The affiliation offer may be extended through the service 105. For example, the affiliation offer may be published using the affiliation offer module 144 as previously described. An email may be generated and sent to the set of electric vehicle operators that notifies them of a pending affiliation offer. The email may include a link to the service 105 which allows the operators to accept or deny the offer.

Flow moves from operation 510 to operation 515 and an acceptance of the affiliation offer is received an electric vehicle operator. The acceptance includes an identifier associated with that electric vehicle operator. In one embodiment, the electric vehicle operator uses the affiliation module 164 to view the affiliation offer, accept the affiliation offer, and provide the identifier. Flow moves from operation 515 to operation 520.

At operation 520, a determination is made whether the electric vehicle operator is allowed to be affiliated with the organization. For example, the identifier that is included in the acceptance is compared with a list of identifiers of electric vehicle operators that are allowed to affiliate with the organization. By way of example, if an organization creates an affiliation group for its employees and requires an employee identifier for verification, the identifier included in the acceptance is compared with a list of employee identifiers. As another example, if a retail organization creates an affiliation group for its reward club members and requires a reward club member identifier for verification, the identifier included in the acceptance is compared with a list of reward club member identifiers. If the electric vehicle operator is not allowed to be affiliated with the organization, then flow moves to operation 525 and the service 105 communicates a rejection message to the electric vehicle operator. The rejection message may indicate the reason of the rejection (e.g., the identifier provided was not valid). If the electric vehicle operator is allowed to be affiliated with that organization, then flow moves to operation 530.

At operation 530, the electric vehicle operator is associated with the organization to provide the set of benefits. For example, if one of the benefit(s) is charging related, the service 105 may automatically confer the benefit for the electric vehicle operator. For example, the service 105 may add the electric vehicle operator to an ACL and/or a pricing group as appropriate. The service 105 may also provide information specified in the set of conditions to the organization. For example, the service 105 may transmit the operator's contact information to the organization if sharing contact information was a condition of the offer. As another example, the service 105 may periodically transmit the charging information of the operator if sharing that information was a condition of the offer.

Although not illustrated in FIG. 5, in one embodiment, prior to extending an affiliation offer as described in operation 510, a secret affiliation code is received from an electric vehicle operator and verified by the service. If the code is valid, then the corresponding affiliation offer is extended as described in operation 510. As will be described in greater detail later herein, in some embodiments an affiliation offer may be extended to only those electric vehicle operators that input a particular secret affiliation code. The particular secret affiliation code may be communicated to the electric vehicle operators using mechanisms outside of the service (e.g., email, text message, phone call, mail, etc.); or through the service.

Figure 7:
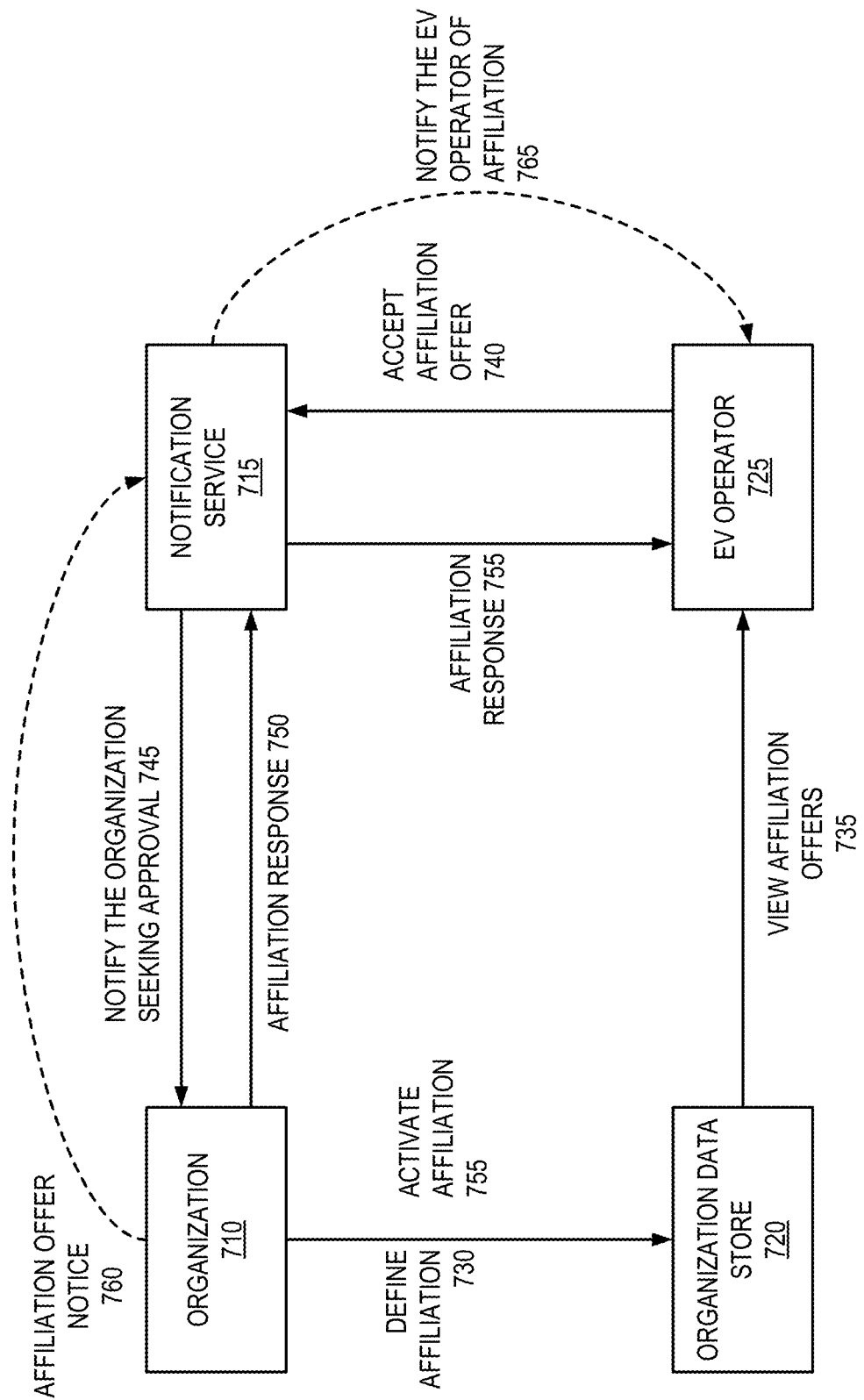
FIG. 7 is a block diagram illustrating an exemplary software architecture view of the affiliation process according to one embodiment.

FIG. 7 is a block diagram illustrating an exemplary software architecture view of the affiliation process according to one embodiment. The organization 710 defines an affiliation 730, the parameters of which are stored in the organization data store 720. By way of example, the organization 710 may define the affiliation using the affiliation definition module 142 as previously described herein.

The EV operator 725 may view the affiliation offer 735. For example, the EV operator 725 may view the offer using the affiliation module 164 as previously described herein. The EV operator 725 may accept the affiliation offer 740, the acceptance of which is communicated to the notification service 715. The EV operator 725 may accept the offer using the afflation module 164 as previously described herein.

The notification service 715 notifies 745 the organization 710 of the acceptance of the affiliation offer. The notification service 715 can notify the organization in a number of ways. For example, the notification service 715 can transmit an email, a text message, etc. to an administrator of the organization 710 that indicates that there are pending accepted affiliation offers. As another example, the notification service 715 can include that information in the organization data store 720 such that the organization 710, when logged into the system, can view the pending affiliation acceptances and approve them.

The organization 710 views the pending affiliation acceptance and determines whether to approve or reject the affiliation acceptance (e.g., using the affiliation verification module 146 as previously described herein). The organization 710 communicates the affiliation response 750 (e.g., either an approved affiliation or a rejected affiliation) to the notification service 715.

The notification service 715 communicates the affiliation response 755 to the EV operator 725, which may be done in any number of ways (e.g., email, text message, through private message on their account with the service, etc.).

Assuming that the affiliation is accepted, the organization 710 activates the affiliation 755 in the organization data store 720, which may include providing the set of benefits of the affiliation.

In some embodiments, the organization 760 communicates a notice of an affiliation offer 760 to the notification service 715, which then notifies 765 the EV operator 725 of the affiliation offer (e.g., through email, text message, etc.).

Specific Examples

While the previous description has described the process of connecting an electric vehicle operator with an organization generally, the following provide specific examples.

In one embodiment, the affiliation process described herein may be applicable to a fleet of electric vehicles and/or electric vehicle rental. By way of example, an electric vehicle operator that rents an electric vehicle and has an account with the service 105 and/or is registered to use certain charging stations (e.g., the electric vehicle operator already has one or more access identifiers that can be used to access charging stations), the electric vehicle operator may want to use their existing access identifiers while having the usage and charging data being included on the rental contract. To say it another way, the electric vehicle operator may like to use an existing charging service account but have the cost of the charging appear on the rental contract.

In such an embodiment, the rental organization (or electric vehicle fleet organization) creates an affiliation group and extends an offer to its customer. The length of the affiliation may coincide with the rental contract. For example, if the rental contract is for seven days, then the length of the affiliation may be seven days. To affiliate with the rental organization and have their usage and charging information be included on the rental contract, the operator may have to provide a contract number and/or a loyalty number, and be willing to share charging information and/or contact information with the organization.

Upon verifying an affiliation between an electric vehicle operator and the rental organization, the service 105 may transmit or otherwise make available the charging information to the organization. The service 105 may also transmit or otherwise make available to the organization the total cost of the charging service provided to that electric vehicle operator during the period of the affiliation.

As another specific example, an organization may define a guest affiliation group for a limited affiliation (e.g., one-day affiliation). The guest affiliation group may be defined by the organization in addition to other affiliation group(s) which may have different benefits, conditions, time restrictions, etc. For example, an organization may create a guest affiliation group that allows guests (e.g., visitors to a company, etc.) to use the charging stations at the premises of the organization for a specific day. The organization may provide an affiliation identifier to the guests that may be good for a limited time (e.g., the day that it is provided). The guest may affiliate with the organization and after verifying the affiliation identifier (either manually or through web services), the affiliation may be automatically approved.

Flexible Administrative Model in an EV Charging Network

Figure 8:
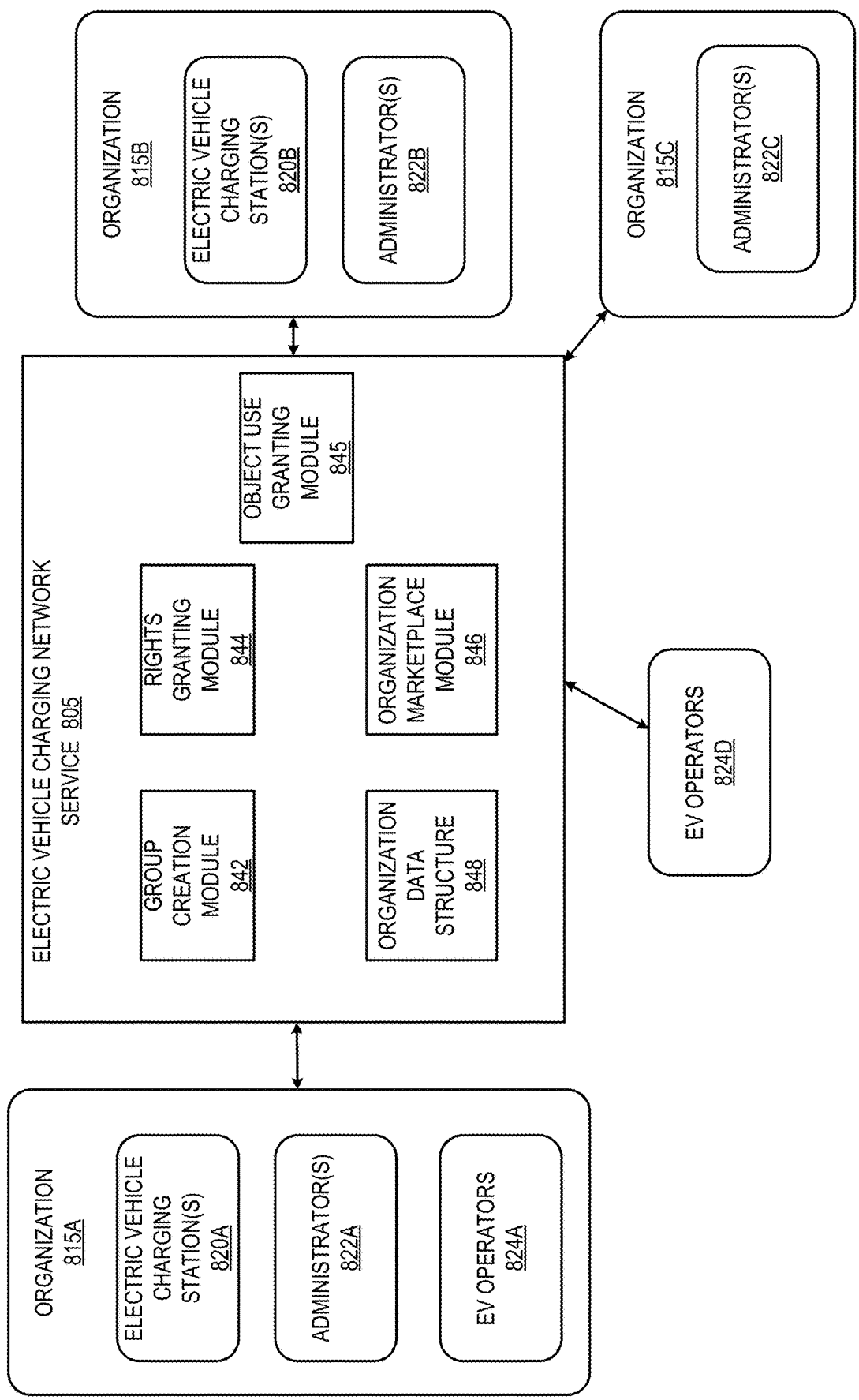
FIG. 8 illustrates an exemplary electric vehicle charging network according to one embodiment.

A method and apparatus for a flexible administrative model in an electric vehicle charging service network is also described. FIG. 8 illustrates an exemplary electric vehicle charging network according to one embodiment. The charging network includes the electric vehicle charging network service 805, which provides many of the features and functionality of the charging network. In one embodiment, the service 805 provides the same functionality as described with respect to the service 105 previously described herein.

The charging network service 805 allows, among other things, organizations to group EV charging objects and/or grant rights over a group of EV charging objects to administrator(s) of their organization and/or to different organizations. For example, the group creation module 842 allows an organization to create custom groups of EV charging objects, the rights granting module 844 allows an organization to grant rights over a group of EV charging objects to different organization(s) and/or assign privilege(s) to administrator(s) of their organization and/or different organization(s), and the object use granting module 845 allows an organization to grant use of EV charging objects to different organization(s). An EV charging object is a representation within the charging network service 805 of an entity that may be associated with one or more organizations. The organization data store 848 stores, among other items, data representing the EV charging objects and their relationship with groups with respect to the organizations.

The charging network service 805 is coupled with the organizations 815A-815C. In one embodiment, each of the organizations 815A-815C is registered with the service and has an account. For example, each of the organizations has at least one administrative login (sometimes referred herein as an administrator). In one embodiment, at a minimum, each organization includes at least one administrator that has certain rights and privileges in the electric vehicle charging service for that organization. Although not illustrated in FIG. 8, the charging network service 805 also includes the ability for organizations to register for the service and create administrator(s).

The organization 815A owns, manages, or controls the charging station(s) 820A, which are networked with the service in one embodiment. The administrator(s) 822A may perform certain administrative tasks for the organization 815A. Example administrative tasks will be described in greater detail later herein. The organization 815A is also associated with the EV operators 824A. By way of example, the EV operators 824A may be employees, customers, or otherwise associated with the organization 815A. The organization 815B owns, manages, and/or controls the charging station(s) 820B and is associated with the administrator(s) 822B. The organization 815C is associated with the administrator(s) 822C. Thus, the organization 815C does not own, manage, or control charging stations that are part of the charging service network. The network operations center 805 is also coupled with the electric vehicle operators 824D, which are not associated with any of the organizations 815A-C. The electric vehicle charging station(s) 820A-B, the administrator(s) 822A-C, and the electric vehicle operators 824A-B may each be represented by a corresponding EV charging object in the charging network service 805.

As described above, the group creation module 842 allows an organization to create custom groups of EV charging objects. In some embodiments, the groups can be hierarchical and/or may overlap other groups. That is, an EV charging object may be members of multiple groups at the same time. By way of example, the groups may include charging station groups, electric vehicle operator groups, electric vehicle groups, and/or administrator groups. The groups may also include a hybrid group that includes different types of EV charging objects (e.g., charging stations and electric vehicle operators in the same group). As part of creating a group, an organization may specify the reason for the group.

Example groups related to charging stations that may be created include demand response groups, administrative groups, configuration groups, attribute groups, reporting groups, remit-to groups, advertising groups, and geographic groups. A demand response group includes charging stations that are to react in a similar way during a demand response event (e.g., be load shed or restored as a group during the demand response event). An administrative group includes charging stations that are to be managed by one or more specified administrators. A configuration group includes charging stations that share the same configuration parameters (e.g., stations that have the same access control and pricing applied). An attribute group includes charging stations that share common attributes such as any one or more of the following: station manufacturer, charging port type (e.g., level one charging, level two charging, DC charging), power level, connector type, model number, date code, etc. A reporting group includes charging stations whose report(s) are to be analyzed as a group. The report(s) may include analytic reports (e.g., energy usage of charging stations of the group, occupancy of charging stations of the group, duration of charging sessions of the group, etc.) and/or financial reports (e.g., amount billed for charging service of the group, amount owed for charging service of the group, etc.). A remit-to group includes charging stations that share a common payment destination. An advertising group includes charging stations that are to display the same set of advertisements. A geographic group includes charging stations that are in a same geographic area (e.g., installed at or near a same building on an organization's campus, installed in the same zip code, city, etc.).

Example groups related to electric vehicle operators that may be created include opt in groups, opt out groups, pricing groups, bill to groups, visibility control list groups, reporting groups, advertising groups, affiliation groups, and access groups. An opt in group includes electric vehicle operators that have opted-in to a certain service (e.g., demand response, coupons, advertising, etc.). An opt-out group includes electric vehicle operators that have opted-out of a certain service (e.g., demand response, coupons, advertising, etc.). A pricing group includes electric vehicle operators that are to have the same pricing structure for electric vehicle charging service. A bill-to group includes electric vehicle operators that are to share the same payment destination. A visibility control list group includes electric vehicle operators that are to be included on the same visibility control list that defines which electric vehicle charging stations are visible on a charging station locator application (such as an interactive map on a website). A reporting group includes electric vehicle operators whose report(s) are to be analyzed as a group. The report(s) may include analytic reports (e.g., energy usage, occupancy, duration of charging sessions, etc.) and/or financial reports (e.g., amount billed for charging service, amount owed for charging service, etc.). An advertising group includes electric vehicle operators that are to receive the same set of advertisements (the advertisements may be displayed through the charging station or through other means such as email, text message, mobile application, etc.). An affiliation group includes electric vehicle operators that are affiliated with the same organization. An access group includes electric vehicle operators that share common charging station access privileges (e.g., are included on the same access control list).

Example groups related to electric vehicles may include an electric vehicle fleet group. Example groups related to administrators include roles groups, rights groups, and EV charging object groups. A role group includes administrators that are to have the same role and corresponding privileges (e.g., charging station installer, charging station maintenance, charging station owner, network management, energy management, usage analyzer, etc.). A rights group includes administrators that are to have the same privileges. An EV charging object group includes administrators that have access to the same set of EV charging objects.

It should be understood that the groups described above are examples and organizations may create different groups in some embodiments.

In some embodiments, the charging network service 805 may automatically create groups based on a set of common parameters. For example, the charging network service 805 may automatically create a group of charging stations that share the same attributes (e.g., one or more of the following: station manufacturer, charging port type (e.g., level one charging, level two charging, DC charging), power level, connector type, model number, and date code). As another example, the charging network service 805 may automatically create a group of charging stations that are in the same geographic region.

Figure 9:
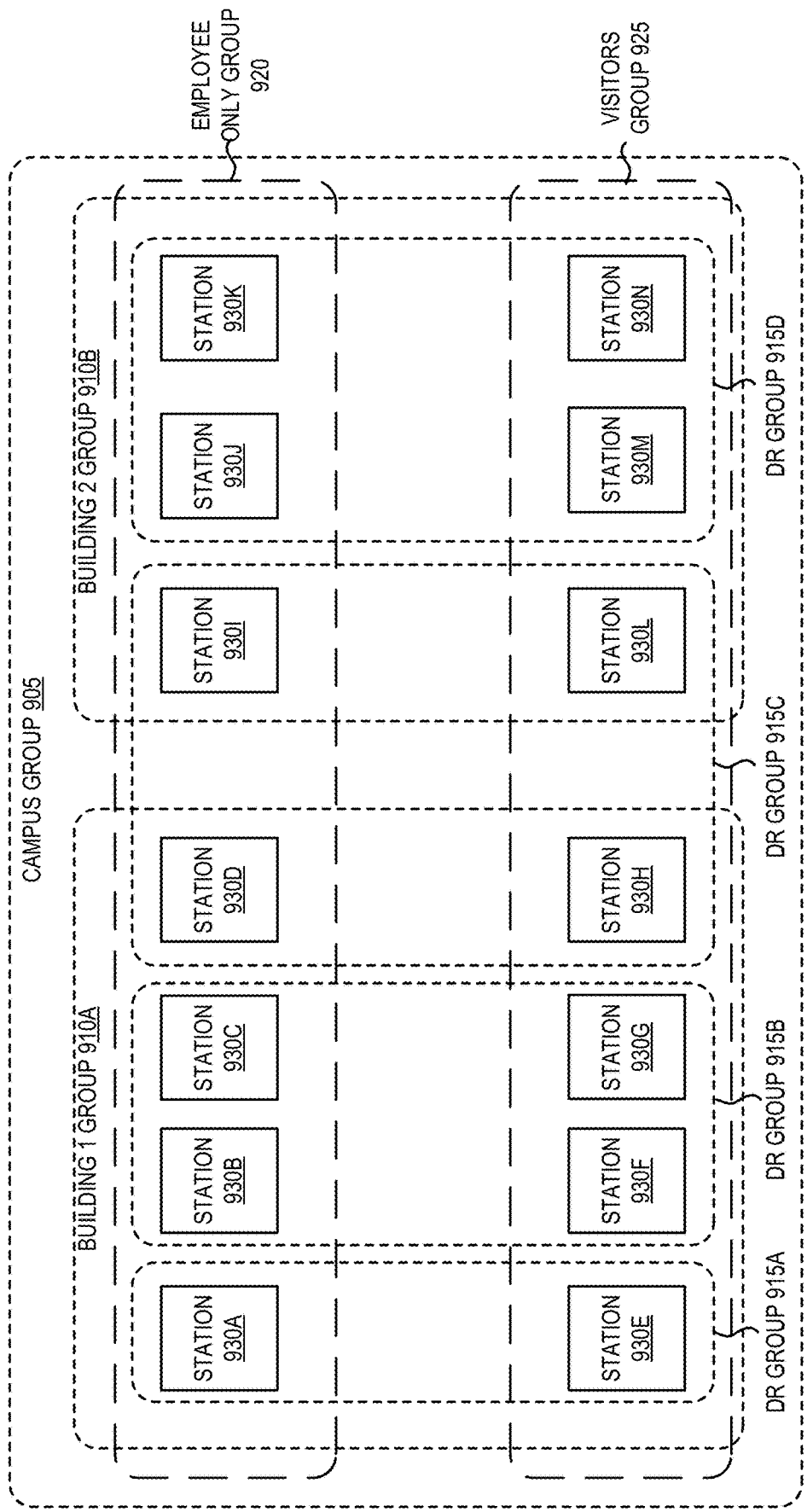
FIG. 9 illustrates an example of groups according to one embodiment.

As described above, in some embodiments, the groups can be hierarchical and/or may overlap with other groups. FIG. 9 illustrates an example of groups according to one embodiment. The groups illustrated in FIG. 9 belong to an organization that manages, owns, and/or controls charging stations. For example, the organization may be a company and have charging stations installed at their company's site. The groups in FIG. 9 have been either created by the organization using the charging network service 805 or have been automatically created by the charging network service 805 for the organization.

As illustrated in FIG. 9, stations corresponding to the station objects 930A-930N are installed at a campus of the organization that includes multiple buildings. FIG. 9 illustrates a number of geographic groups of charging stations. As illustrated in FIG. 9, a campus group 905 includes all of the stations objects 930A-930N. By way of example, the campus group 905 may be used for reporting purposes for all of the stations installed at the campus. A building 1 group 910A includes the charging stations objects 930A-930H that correspond to charging stations that are installed at or near the physical building 1. A building 2 group 910B includes the charging station objects 930I-930N that correspond to charging stations that are installed at or near the physical building 2.

FIG. 9 also illustrates several demand response groups. For example, a demand response group 915A includes the station objects 930A and 930E, the demand response group 915B includes the station objects 930B-1F30C and 930E-930G, the demand response group 915C includes the station objects 930D, 930H, 930I, and 930L, and the demand response group 915D includes the station objects 930J-930K and 930M-930N. The organization may have created the demand response groups so that those stations that are members are treated in the same way during a demand response event (e.g., be load shed or restored as a group). The demand response group 915C includes charging stations objects 930D, 930H, 930I, and 930L that correspond to charging stations that are installed at or near different physical buildings.

FIG. 9 also illustrates the employee only group 920 and the visitors group 925. The employee only group 920 includes the station objects 930A-930D and 930I-930K. The employee only group 920 may be created with the intention of limiting access to the stations corresponding to the station objects 930A-930D and 930I-930K to employees only. For example, an access control list may be applied to the stations corresponding to the station objects 930A-930D and 930I-930K as a group that only allows employees to use those stations. The visitors group 925 includes the station objects 930E-930H and 930L-930N. The visitors group 925 may be created with the intention of limiting access to the stations corresponding to the station objects 930E-930H and 930L-930N to visitors only (e.g., non-employees).

Figure 10:
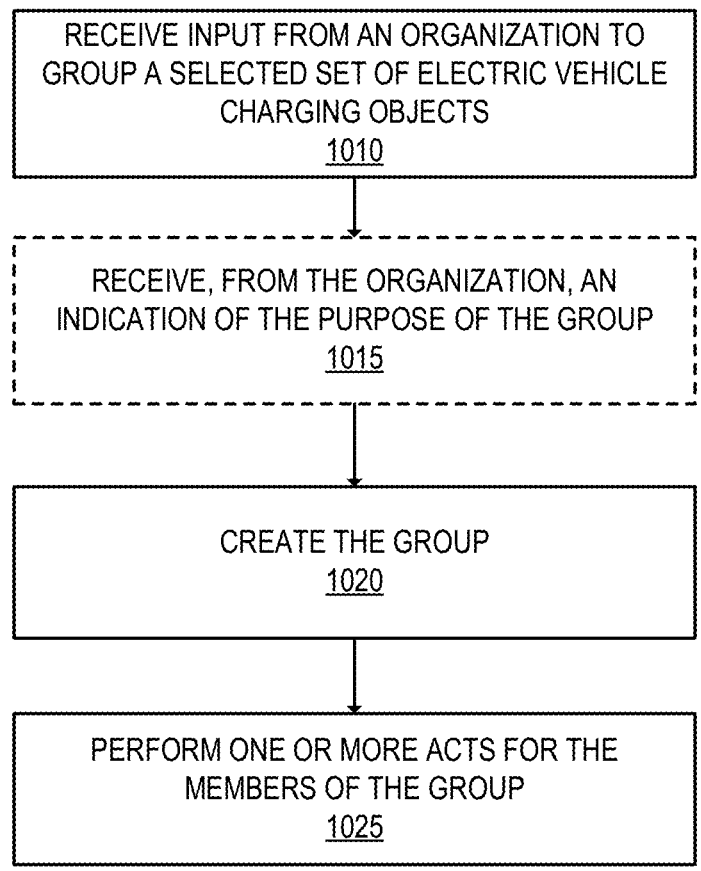
FIG. 10 is a flow diagram that illustrates exemplary operations for creating a group according to one embodiment.

FIG. 10 is a flow diagram that illustrates exemplary operations for creating a group according to one embodiment. The operations of FIG. 10 will be described with reference to the exemplary embodiment of FIGS. 8, 12, and 13. However, it should be understood that the operations of FIG. 10 can be performed by embodiments of the invention other than those discussed with reference to FIGS. 8, 12, and 13, and the embodiments discussed with reference to FIGS. 8, 12, and 13 can perform operations different than those discussed with reference to FIG. 10.

At operation 1010, the group creation module 842 receives input from an organization to group a selected set of electric vehicle charging objects. For example, the organization (in particular an administrator at the organization) may create a group. Creation of the group may include providing a name for the group and selecting the members of the group (the electric vehicle charging objects). For example, if creating a group of charging stations, the administrator of the organization may provide a name for the group and indicate which charging station objects and/or other existing groups of charging stations are to be members of the group. Flow then moves to operation 1020, which is optional, where the group creation module 842 receives input from the organization that indicates a purpose of the group.

FIG. 12 is an exemplary interface to the group creation module 842 that allows organizations to create custom groups of electric vehicle charging objects according to one embodiment. In one embodiment, the group creation interface 1205 is a web interface that is available through the charging network service 805 or is an application (e.g., a mobile application) that is networked with the charging network service 805. In some embodiments, the group creation interface 1205 is available only to organizations that are registered with the service. In some embodiments, the group creation interface 1205 is available only to those organizations that have purchased a package that includes custom group creating abilities (that is, in these embodiments the service may require organizations to pay a fee for the ability to create custom groups).

In one embodiment, the input to create a group is received from an organization using the group creation interface 1205. For example, the group creation interface 1205 includes a field 1210 for providing the name of the organization that will contain the group (the administrator that is creating the group may belong to a different organization but include rights to create a group for the named organization), a field 1215 for providing a name of the group, and 1220 for inputting a description of the purpose of the group. The field 1225 allows the organization to select a pre-defined group type (e.g., geographical group, administrative group, demand response group) or add a new custom group type.

Figure 13:
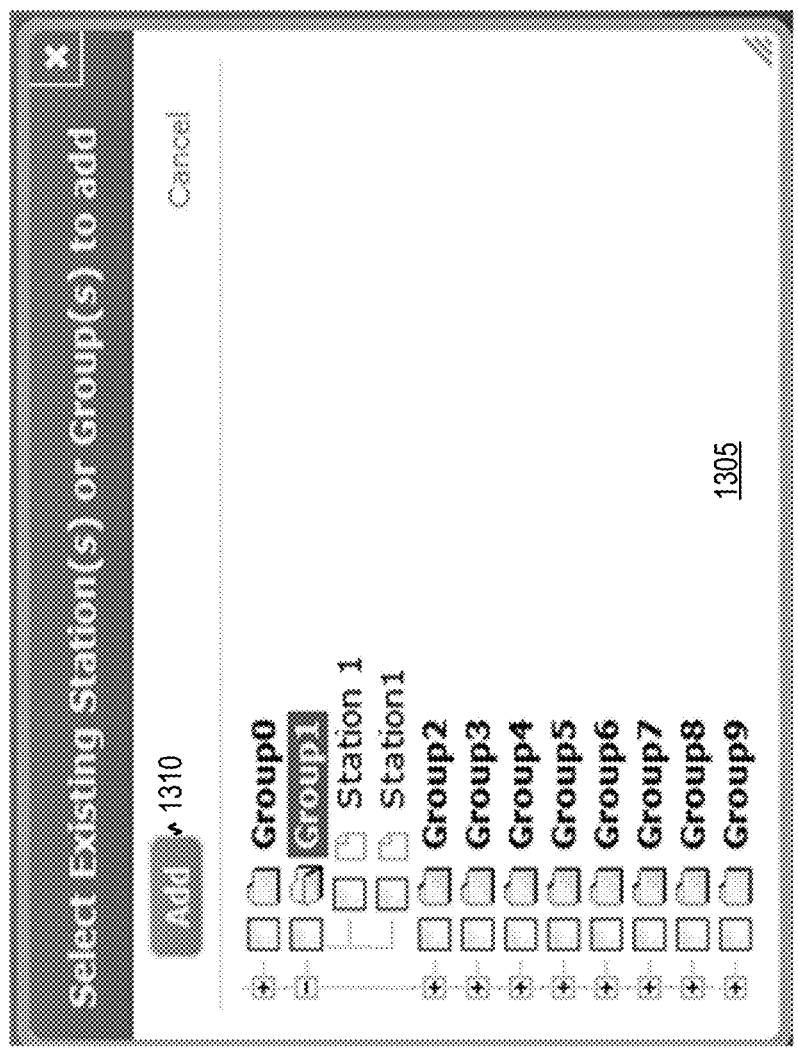
FIG. 13 illustrates an exemplary interface that displays the station hierarchy for the organization as a result of selecting the add station/group of stations button illustrated in FIG. 12 according to one embodiment.

After defining the general characteristics of the group, the administrator may select the add station/group of stations button 1230 which, when selected, causes a window to be displayed of the existing station hierarchy of the named organization, including any existing station groups, and may also include the station hierarchy of any third party organizations that the named organization has been granted rights to. For example, FIG. 13 illustrates an exemplary interface 1305 that displays the station hierarchy for the organization as a result of selecting the add station/group of stations button 1230. As illustrated in FIG. 13, stations and/or groups of stations may be selected, and the selected stations and/or groups of stations may be added as members to the custom group by selecting the add button 1310.

While FIG. 12 illustrates an interface to create a charging station group, other types of groups (e.g., electric vehicle operator groups, administrator groups) may be created in a similar way.

Flow then moves to operation 1020 where the group creation module 842 creates the group with the identified electric vehicle charging objects. For example, the group creation module 842 creates a group object and associates the identified electric vehicle charging objects with the created group object.

Flow then moves to operation 1025 where a set of one or more acts are performed for the members of the group. The grouping of the electric vehicle charging objects allows organizations to easily cause an action to be performed on members of that group. For example, if the group includes charging station objects as members, an administrator of the organization may apply the same pricing for charging service to the group of charging stations (e.g., without selecting and applying the pricing to charging stations individually).

Figure 14:
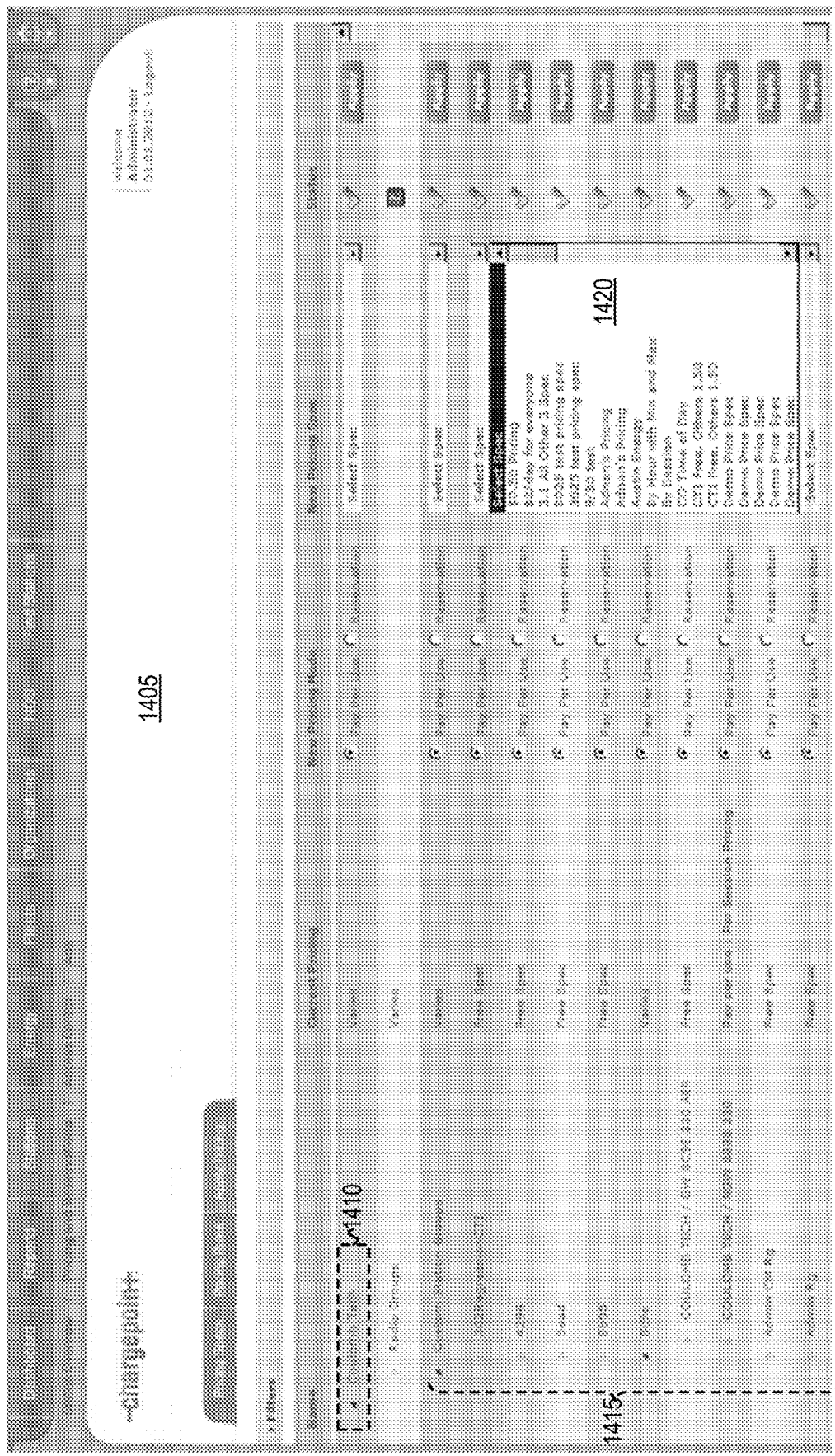
FIG. 14 illustrates an exemplary interface for an administrator to apply the same pricing for charging service for a group of charging stations according to one embodiment.

For example, FIG. 14 illustrates an exemplary interface 1405 for an administrator to apply the same pricing for charging service for a group of charging stations. In one embodiment, the interface 1405 is a web interface available over the Internet that is provided by the service. For example, the interface 1405 is available to an organization that is registered with the service and that organization's information is populated into the interface. As illustrated in FIG. 14, the organization "Coulomb Tech" 1410 has created a number of custom electric vehicle station groups, as indicated by 1415. Each of these electric vehicle charging station groups typically has multiple charging stations, although it is possible for a group to have only a single charging station. As illustrated, for each of the custom groups, the administrator can use the drop down button 1420 to select from any number of pricing specifications to apply to the custom group. The pricing specifications may have been predefined by that organization and/or defined by the service (e.g., weekend charging, free charging, etc.). Upon selecting a pricing specification and applying it to the group, the service 805 causes the pricing to be applied to the members of the group. In the case of a pricing specification, in one embodiment the service 805 communicates the pricing specification to the member charging stations so that they may apply them locally.

In some embodiments, if a charging station leaves or is added to a charging station group, the applied pricing specification is automatically updated to reflect the membership change. For example, if a pricing specification has been applied to a charging station group and a charging station has been added to that group, the service 805 may automatically apply that pricing specification to that charging station (which may include transmitting the pricing specification to that charging station). Similarly, if a pricing specification has been applied to a charging station group and one of its member charging stations has been removed from the group, the service 805 automatically removes the application of the pricing specification from that charging station.

Figure 15:
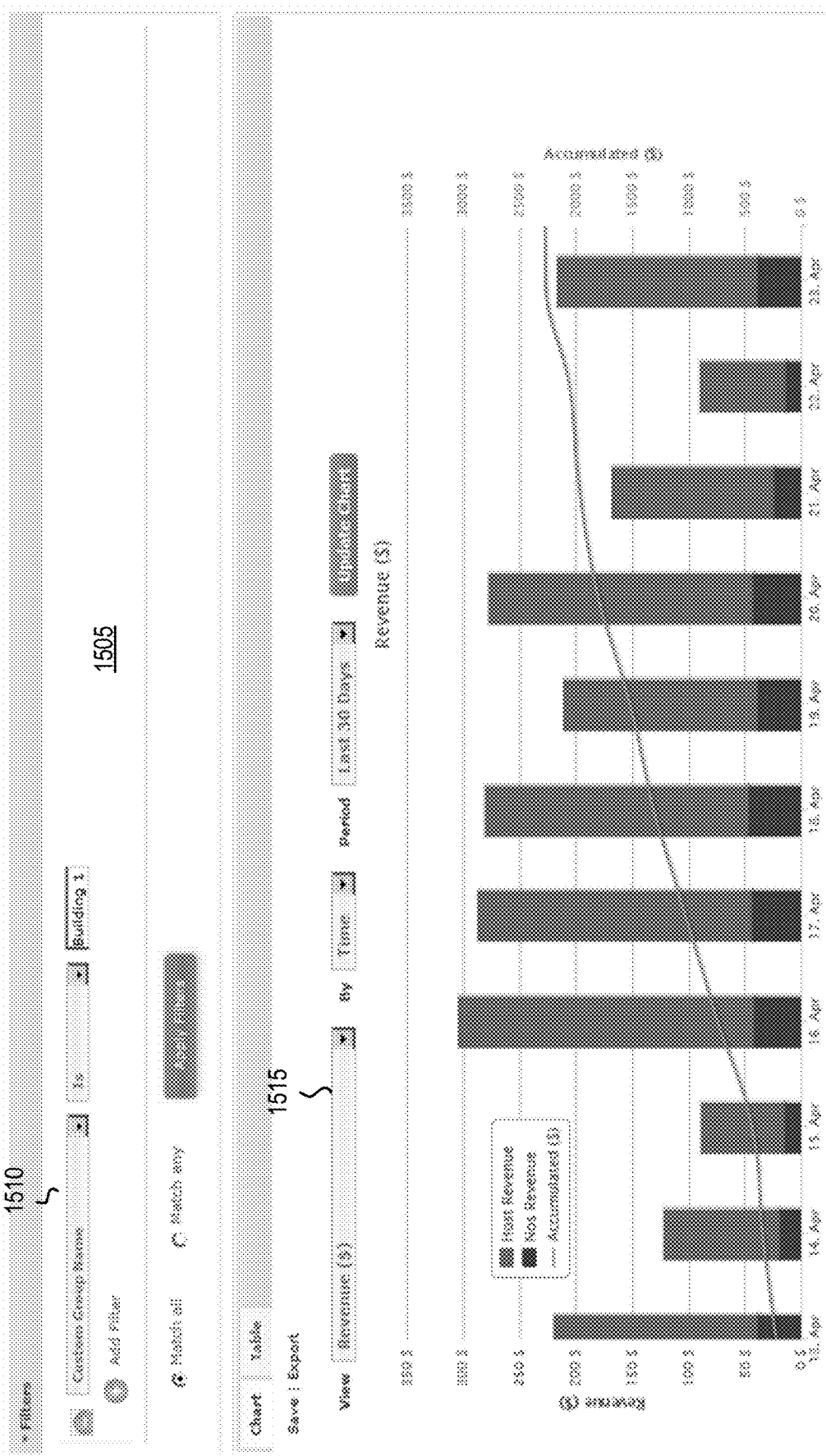
FIG. 15 illustrates an exemplary interface for an administrator to view the usage history, occupancy, and/or revenue generated by a group of charging stations according to one embodiment.

As another example of an act to be performed, if the group includes charging station objects as members, an administrator of the organization may view the usage history, occupancy, revenue generated of the group by simply selecting the group. For example, FIG. 15 illustrates an exemplary interface 1505 for an administrator to view the usage history, occupancy, and/or revenue generated by a group of charging stations according to one embodiment. In one embodiment, the interface 1505 is a web interface available over the Internet that is provided by the service. The administrator may select a group using the drop down list 1510. The administrator may further select a particular type of report (e.g., usage history, occupancy, revenue, etc.), using the drop down list 1515. The administrator may also specify other parameters of the report including the time period of the report (e.g., the last thirty days, etc.). While FIG. 15 illustrates the results of the report in a bar graph form, it should be understood that there may be other ways of presenting the information. Also, while FIG. 15 illustrates that the reports may be generated per group, in some embodiments the reports maybe generated for all groups.

Figure 16:
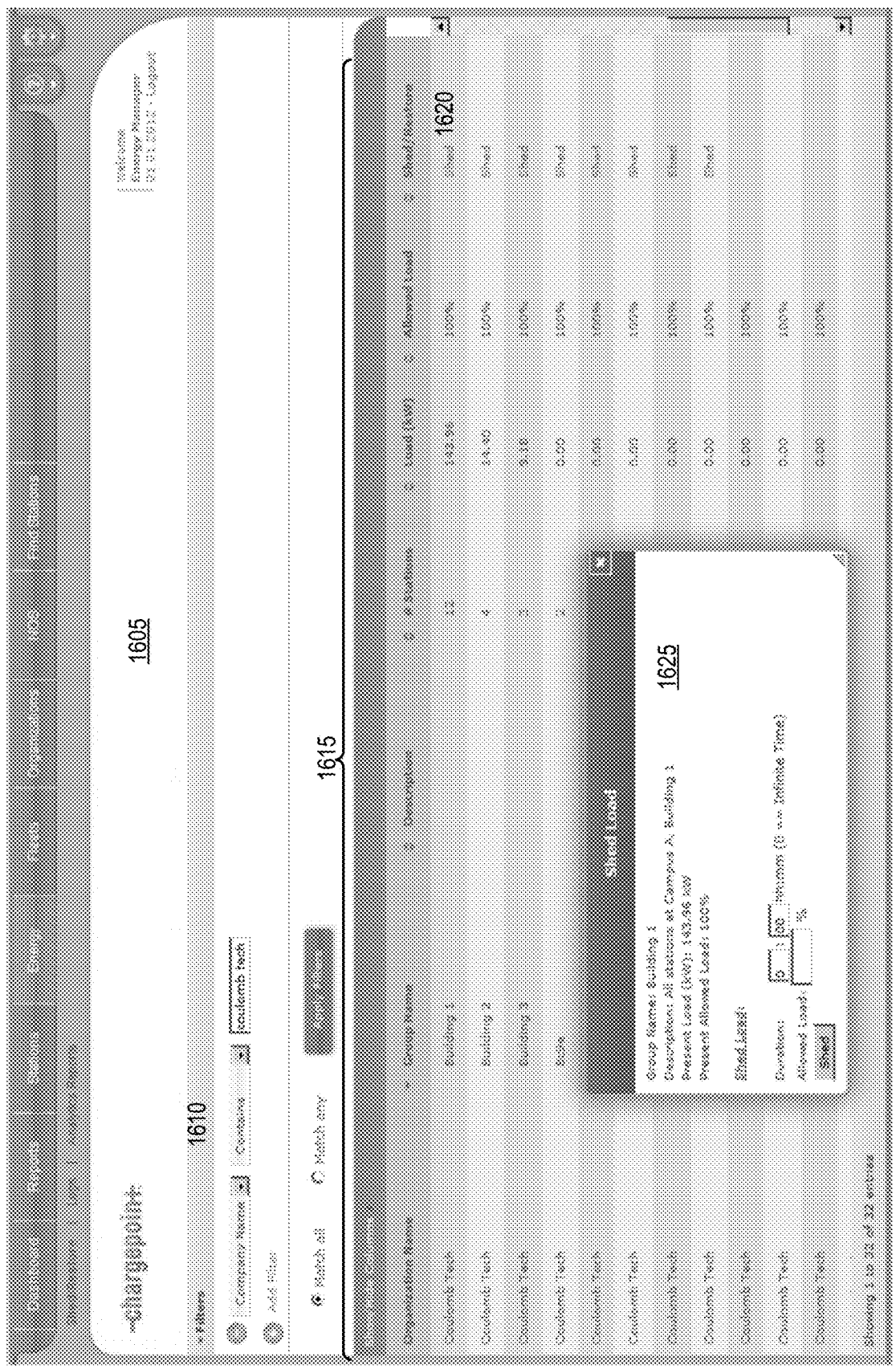
FIG. 16 illustrates an exemplary interface for an administrator to load shed the members of a group as a whole according to one embodiment.

As another example, if the group includes charging station objects as members, an administrator of an organization such as a utility may load shed the members of the group as a whole (e.g., without selecting and shedding the members individually). As will be described in greater detail below, the set of acts may include granting rights over the members of the custom group to one or more other organizations and/or one or more administrators. For example, FIG. 16 illustrates an exemplary interface 1605 for an administrator (e.g., an administrator of a utility company or other administrator with load shedding rights) to load shed the members of a group as a whole (e.g., without having to select and shed each member individually). The interface 1605 allows the organization to select an organization to view their groups of charging stations using the controls 1610. In the example of FIG. 16, the administrator has selected "Coulomb Tech" as the organization. After specifying the organization, the groups of that organization are displayed in the table 1615. The table 1615 includes a column for the group name, a column for a description of the group, a column for the number of stations in that group, a column for the amount of load (in kW) drawn by that group, a column for the current allowed load for that group as a percentage, and a link 1620 to select to load shed or load restore the group. By way of example, upon selecting the link 1620 for a particular group, the window 1625 is displayed that allows the administrator to indicate the desired load of the group (e.g., as a percentage), which may be an increase or a decrease in allowed load, and further allows the administrator to specify the duration of the load shedding command.

Rights Granting

In some embodiments, organizations may grant rights over EV charging object(s) to different organization(s) and/or assign privilege(s) to administrator(s) of their organization and/or different organization(s). In some embodiments, organizations may grant rights over a custom group of EV charging objects (as previously described) or an automatically created group of EV charging objects. An organization can only grant those rights that it itself has rights to, and similarly, may only assign those privileges to administrators that it has rights to. In some embodiments, an organization that has been granted rights may grant some or all of those rights to another party, which may be a right in and of itself.

In some embodiments, rights are granted to the group and are inherited to any sub-groups within that group. In addition, the rights automatically transfer to objects within the group as the membership changes. For example, if an organization grants visibility rights over a group of charging stations to a third party organization, that third party organization may view at a given time only the charging stations that are members of the group. Thus, if a charging station is added to the group, the third party organization will be able to view that charging station. If a charging station is removed from the group, the third party organization will no longer be able to view that charging station (at least through that group).

In some embodiments, an organization that has been granted rights over a group of electric vehicle charging objects may regroup those objects as they see fit. By way of example, if organization A grants rights over groups A1 and A2 to organization C, and organization B grants rights over groups B1 and B2 to organization C, organization C may create its own groups C1, C2, C3, etc., that could be any mix of the groups A1, A2, B1, and B2.

With reference to FIG. 8, the rights granting module 844 allows organizations to grant rights over EV charging object(s) to different organization(s). The rights granting module 844 may also allow organizations to assign privilege(s) to their administrator(s) and/or to administrator(s) of different organization(s).

There may be many different rights that can be granted. Generally speaking, the grantable rights may be categorized as follows: organization rights, charging station rights, troubleshooting rights, reporting rights, and energy management rights. Organization rights may include viewing administrators, editing administrators (e.g., being able to create an administrator login and assign rights to that administrator), rights management, and re-granting rights. Organization rights are typically given to network manager. Station rights may include listing stations, configuring stations (e.g., configuring and/or assigning advertisements to be displayed on the station, configuring and/or assigning the access control policy to be applied to the station, configuring and/or assigning the pricing scheme for the station, configuring and/or applying reservations for charging stations), and provisioning stations (e.g., adding a station that is to be connected to the network). Troubleshooting rights may include the ability to test charging stations and/or the network, view the status of charging stations and/or the network, etc. The reporting rights may include allowing usage reports (e.g., energy usage), financial reports, and/or a list of reservations to be generated and/or viewed. The energy management rights may include the rights to load shed and restore in a demand response event.

The rights that are granted to a third party organization and/or to an administrator can vary in size and scope. The granted rights can be broad (e.g., all rights) to narrow (e.g., usage reporting only) or anything in between.

Figure 17:
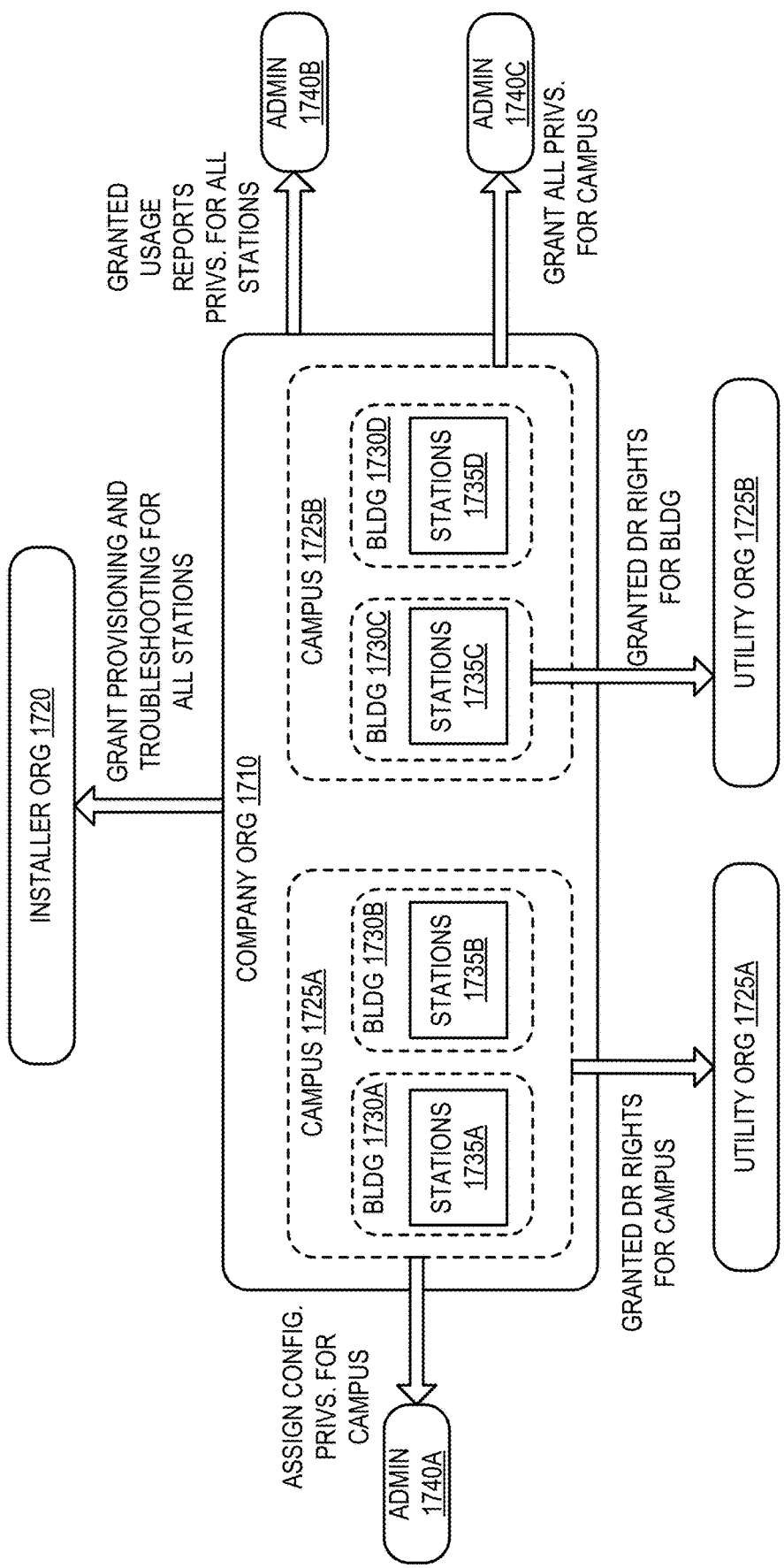
FIG. 17 illustrates an example of rights granting according to one embodiment.

FIG. 17 illustrates an example of rights granting according to one embodiment. As illustrated in FIG. 17, the company organization 1710 grants rights to third party organizations (the installer organization 1720 and the utility organizations 1725A-1725B). The company organization 1710 includes several campuses which may be located in different cities and each has charging stations. As illustrated in FIG. 17, the campus groups 1725A-1725B have been created. The campus group 1725A includes the station objects 1735A-1735B and the campus group 1725B includes the station objects 1735C-1735D. Building groups 1730A-1730B have been created within the campus 1725A and include the stations objects 1735A-1735B respectively. Building groups 1730C-1730D have been created within the campus 1725B and include the station objects 1735C-1735D respectively. In one embodiment, the groups illustrated in FIG. 17 have been created by the company organization 1710 (which itself may be a group that includes all of the charging stations belonging to that organization).

The installer organization 1720 is an organization that performs installation services on behalf of the company organization 1710. For example, the installer organization 1720 may provision the charging stations of the company organization 1710 to the network and/or physically install the charging stations of the company organization 1710. As illustrated in FIG. 17, the company organization 1710 has granted provisioning and troubleshooting rights over all of its stations to the installer organization 1720. Thus, the installer organization 1720 may perform actions related to provisioning and troubleshooting for each of the stations of the company organization 1710 that are part of the network. Although not illustrated in FIG. 17, the installer organization 1720 may create administrator(s) and/or assign all or some of the provisioning and troubleshooting rights that have been granted to one or more of its administrators and/or to other organizations.

The utility organizations 1725A and 1725B may be public or private electric utilities that generate and/or supply the energy for the charging stations represented by the station objects 1735A-B and 1735C-D respectively. As illustrated in FIG. 17, the company organization 1710 has granted demand response rights over the campus group 1725A (which currently includes the station objects 1735A-1735B). As a result, for example, during periods of high demand, the utility organization 1725A may shed at least some of the load being drawn by the stations represented by the station objects 1735A-1735B. The company organization 1710 has also granted demand response rights over the stations corresponding to the station objects that have been added to the building group 1730C (the stations represented by the station objects 1735C) to the utility organization 1725B. It should be noted that the company organization 1710 has not granted the utility organization 1725B demand response rights over the stations corresponding to the station objects included in the building group 1730D (the stations represented by the station objects 1735D), even though the utility organization 1725B supplies electricity for those stations. Although not illustrated in FIG. 17, the utility organizations 1725A-B may create administrator(s) and/or assign all or some subset of the demand response rights to one or more of their administrators and/or to other organizations.

FIG. 17 also illustrates the company organization 1710 assigning privileges to multiple administrators. The company organization 1710 has assigned the administrator 1740A configuration privileges for the stations corresponding to the station objects in the campus group 1725A. The company organization 1710 has assigned the administrator 1740B usage reports privileges for all of its stations that are part of the network (the stations represented by the station objects 1735A-D). The company organization 1740C has assigned the administrator 1740C all privileges over the stations corresponding to the station objects in the campus group 1725B.

Figure 18:
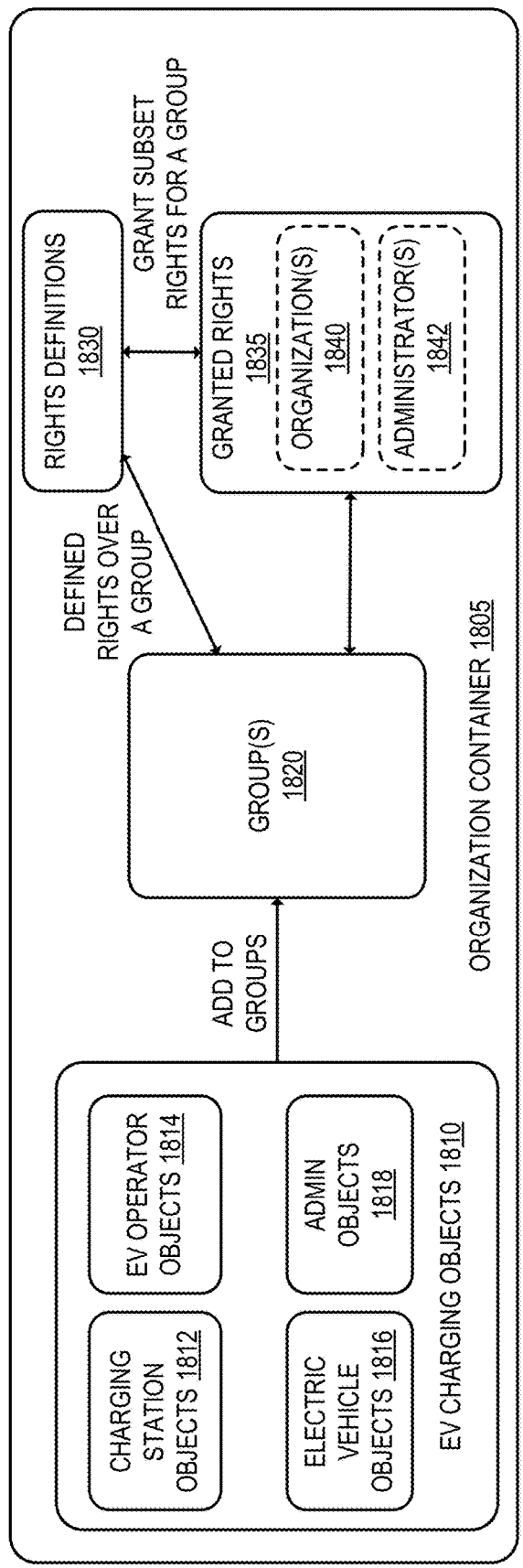
FIG. 18 illustrates a logical view of groups and granting rights over the groups according to one embodiment.

FIG. 18 illustrates a logical view of groups and granting rights over the groups according to one embodiment. The organization container 1805 holds the EV charging objects 1810 which may include the charging station objects 1812, the electric vehicle operator objects 1814, the electric vehicle objects 1816, and the administrator objects 1818. The organization may create one or more group(s) 1820 and add specified ones of the charging objects 1810 to those groups as previously described. The rights definitions 1830 defines the rights and privileges that may be granted over the group(s) 1820 and the granted rights 1835 indicates who has been granted a subset of the rights over the group(s) 1820 (e.g., to organization(s) 1840 and/or to administrator(s) 1842).

Figure 19:
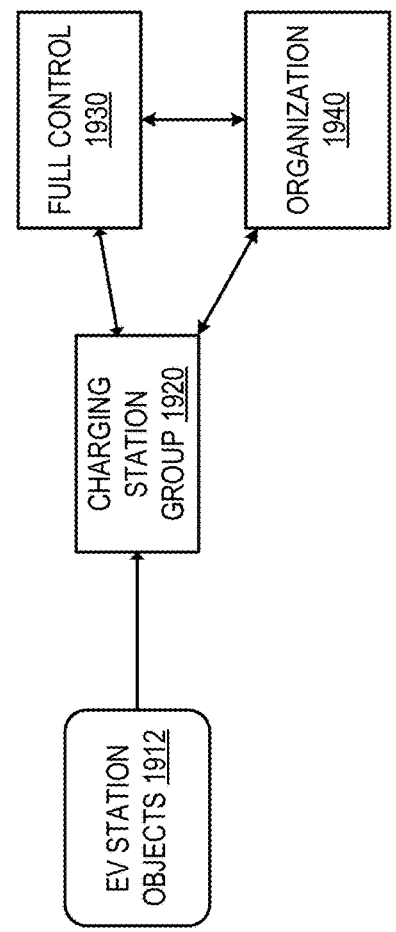
FIG. 19 illustrates an example of granting rights over a group using the logical view of FIG. 18 according to one embodiment.

FIG. 19 illustrates an example of granting rights over a group using the logical view of FIG. 18 according to one embodiment. The charging station objects 1912 are members of the charging station group 1920. The group 1920 may have been created by the organization or have been automatically created by the service. Full control rights 1930 have been defined for the group 1920. That is, the organization may selectively grant all or some of the full control rights to other organization(s) and/or assign all or some of the full control privileges over those rights to administrator(s) of their organization and/or to administrator(s) of other organization(s). The organization has granted a subset of the full control rights 1930 over the stations of the group 1920 to the organization 1940.

As another example, an electric vehicle service provider (EVSP) organization, which installs charging stations at a third party property owner site and reimburses that property owner for the cost of energy used through those charging stations, may create a group of those charging stations. The EVSP organization may create an administrator for that property owner and assign usage reporting privileges only for those charging stations to the administrator. The EVSP may share the administrator login information with the property owner so that the property owner can login to the service and independently verify the amount of energy that is being used through the charging stations. In some embodiments, if the property owner already has an administrator account, the EVSP organization may assign the usage reporting privileges to that administrator account directly.

Figure 11:
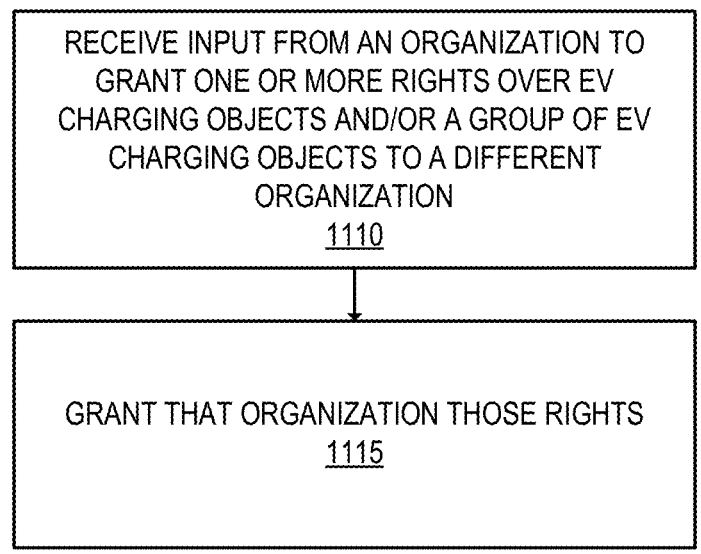
FIG. 11 is a flow diagram illustrating exemplary operations for granting rights to different organization(s) according to one embodiment.

FIG. 11 is a flow diagram illustrating exemplary operations for granting rights to administrator(s) within their organization and/or to different organizations according to one embodiment. The operations of FIG. 11 will be described with reference to the exemplary embodiment of FIGS. 8 and 20. However, it should be understood that the operations of FIG. 11 can be performed by embodiments of the invention other than those discussed with reference to FIGS. 8 and 20, and the embodiments discussed with reference to FIGS. 8 and 20 can perform operations different than those discussed with reference to FIG. 11.

Figure 20:
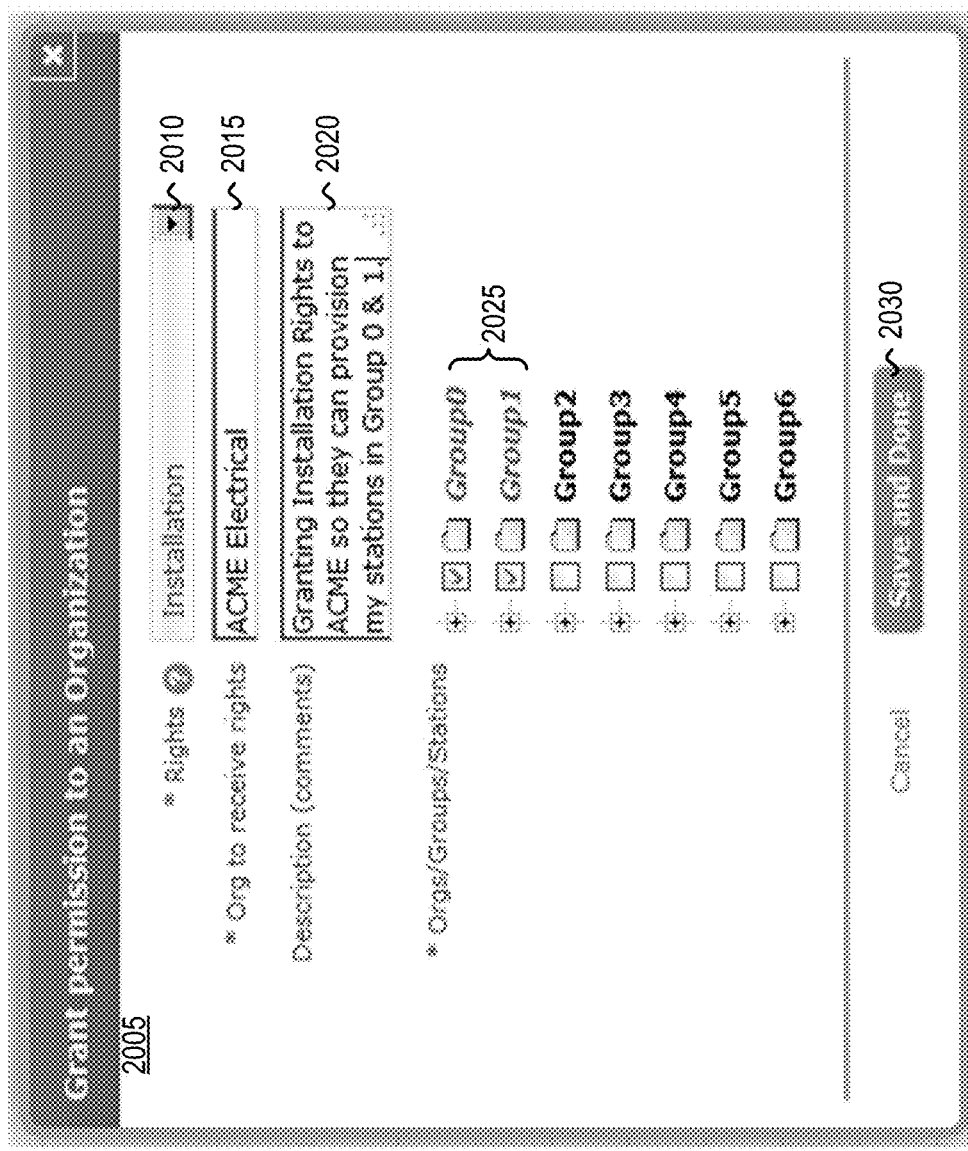
FIG. 20 is an exemplary interface to the rights granting module that allows organizations to grant rights over EV charging objects and/or groups of EV charging objects to organizations according to one embodiment.

At operation 1110, the rights granting module 844 receives input from an organization to grant one or more rights over EV charging objects and/or groups of EV charging objects to a different organization. The rights granting module 844 could also receive input from an organization to assign one or more of the privileges of the rights it has been granted to one or more administrators. FIG. 20 is an exemplary interface to the rights granting module 844 that allows organizations to grant rights over EV charging objects and/or groups of EV charging objects to organizations according to one embodiment. In one embodiment, the rights granting interface 2005 is a web interface that is available through the charging network service 805 or is an application (e.g., a mobile application) that is networked with the charging network service 805. In some embodiments, the rights granting interface 2005 is available only to organizations that are registered with the service. In some embodiments, the rights granting interface 2005 is available only to those organizations that have purchased a package that includes the capability of granting rights (that is, in these embodiments the service may require organizations to pay a fee for the ability to grant rights).

In one embodiment, the input to grant rights is received through the rights granting interface 2005. For example, the rights granting interface 2005 includes a rights field 2010 that allows an administrator to select a package of pre-defined rights to grant. As illustrated in FIG. 20, a package of installation rights have been selected. FIG. 21 illustrates exemplary packages of pre-defined rights according to one embodiment. Example packages of pre-defined rights include network management rights, station management rights, station partner rights, installation rights, energy management rights, detailed usage analysis rights, and summary usage analysis rights. The package of network management rights includes rights to manage an organization, rights to configure stations, rights to troubleshoot stations, rights to provision (activate) stations, rights to suspend or resume stations (demand response rights), rights for detailed usage reporting, and rights to summary usage reporting. The package of station management rights includes rights to configure stations, rights to troubleshoot stations, rights to provision (activate) stations, rights for detailed usage reporting, and rights to summary usage reporting. The package of station partner rights includes rights to troubleshoot stations, rights for detailed usage reporting, and rights to summary usage reporting. The package of installation rights includes rights to provision (activate) stations, rights for detailed usage reporting, and rights to summary usage reporting. The package of energy management rights includes rights to suspend or resume stations (demand response rights), rights for detailed usage reporting, and rights to summary usage reporting. The package of detailed usage analysis rights includes rights for detailed usage reporting and rights to summary usage reporting. The package of summary usage analysis rights includes rights to summary usage reporting.

While embodiments have been described that allow an administrator to select a package of pre-defined rights to grant, embodiments are not so limited. For example, an administrator may select individual rights to grant rather than a package of rights. Also, an administrator may create their own package of rights and grant them.

Referring back to FIG. 20, the rights granting interface 2005 includes a field 2015 for allowing the organization to input the organization that is to receive the rights. In some embodiments, the organization may select from the organizations that have been created. As illustrated in FIG. 20, the organization ACME Electrical has been selected to receive the installation rights.

The rights granting interface 2005 includes a field 2020 that allows the organization to input a description, which may be used for providing a reason for granting the rights. In some embodiments, the field 2020 is optional. The rights granting interface 2005 also is populated with the groups, stations, and organization(s) of the organization that may be selected. As illustrated in FIG. 20, the group0 and group1 have been selected 2025 so that ACME Electrical will be granted installation rights over the charging stations that are members of group0 and group1. As illustrated in FIG. 20, the interface 2005 allows an organization to grant rights over an organization (including itself) to a third party organization. The organization may select the save and one button 2030 to cause the identified rights to be granted to the specified organization.

Figure 22:
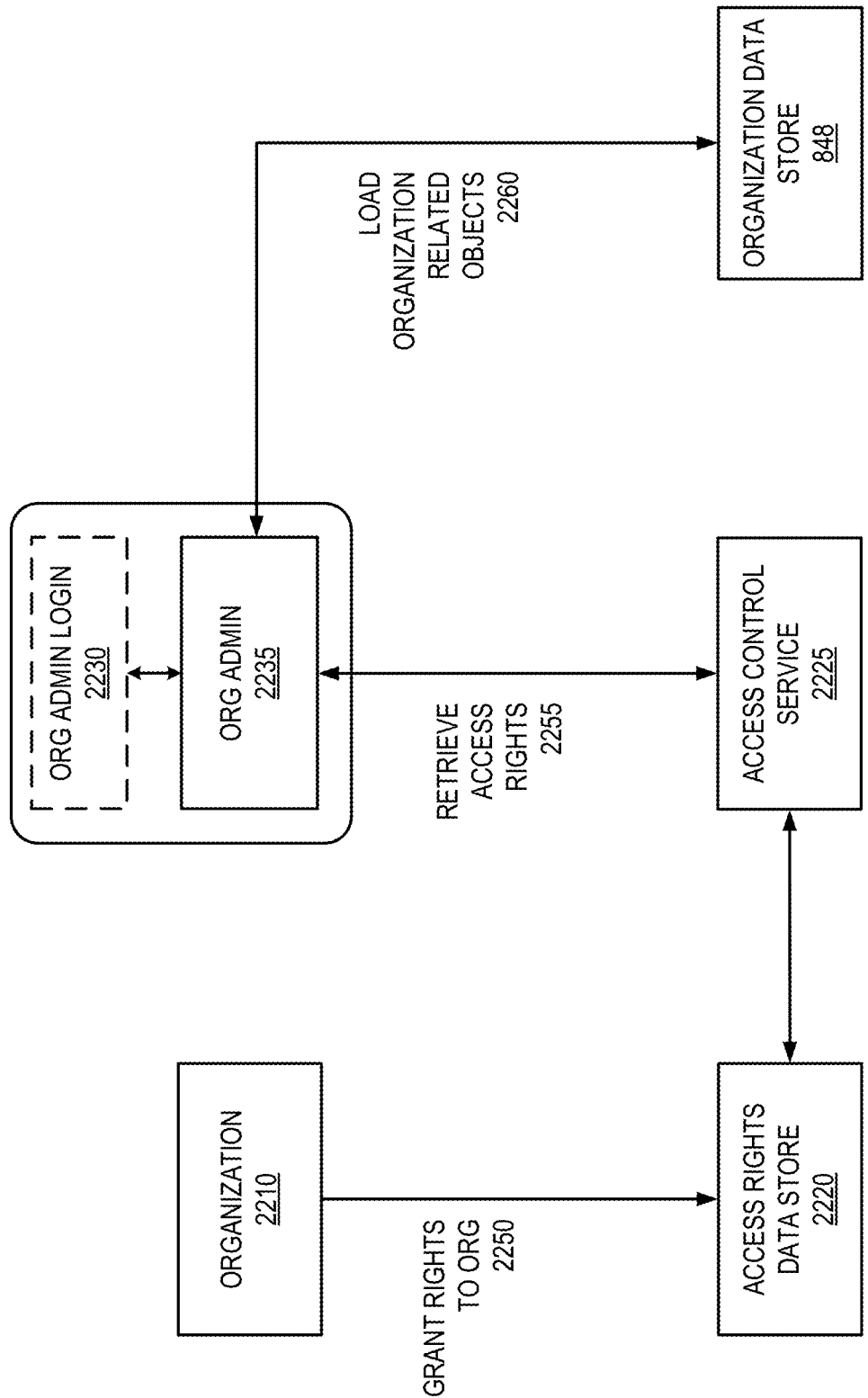
FIG. 22 is a block diagram that illustrates an exemplary software architecture view of the rights granting process according to one embodiment.

Referring back to FIG. 11, flow moves from operation 1110 to operation 1115 where those rights are granted to the different organization. FIG. 22 is a block diagram that illustrates an exemplary software architecture view of the rights granting process according to one embodiment. The organization 2210 grants right to another organization (which is not illustrated) 2250. The rights that are granted are stored in the access rights data store 2220. In one embodiment, the access rights data store 2220 stores the access rights for organizations and administrators of the organizations. When an administrator 2235 for an organization logs into the service 2230, the access control service 2225 retrieves the access rights 2255 that have been granted or otherwise apply for that administrator. Also, the organization related objects are loaded 2260 for the administrator such that the administrator may view those objects, manipulate those objects (e.g., assign them to groups, etc.), etc.

Although not illustrated in FIG. 8, in some embodiments, the charging network service 805 includes an interface that allows organizations to create additional organization(s). In one embodiment, if a first organization creates a second organization, the second organization automatically inherits all of the rights of the first organization, however the first organization may revoke one or more rights from the second organization, and the second organization may revoke one or more of the granted rights from the first organization. In some embodiments, an organization that has previously granted rights to an organization and/or an administrator may unilaterally revoke any rights previously granted, while in other embodiments revocation of granted rights requires approval by the grantee entity.

Organization Marketplace

In some embodiments, the flexible administrative model described herein allows for the service to provide an organization marketplace to broker communication and services between different organizations. For example, an organization may grant certain rights to a third party organization in exchange for a fee. As another example, an organization may grant certain rights to a third party organization in exchange for rights from that third party organization.

The charging network service 805 includes the organization marketplace module 846 that allows organizations to make and/or accept rights granting offers and/or object use granting offers (described in more detail later herein). For example, an organization may use the organization marketplace module 846 to offer certain rights and/or use of an object in exchange for a fee or service (e.g., reciprocal or other exchange of rights granting). As another example, an organization may use the organization marketplace module 846 to offer payment in exchange for being granted certain rights and/or objects. In one embodiment, the service may receive a percentage of the amount of money exchanged between the organizations.

In some embodiments, organizations can search the marketplace for offers based on one or more of the following: offer type (e.g., all demand response offers); monetary amount of offers; date of offer; and location of offer. In some embodiments, organizations publishing offers to the marketplace can restrict the eligibility and visibility of the offers to only certain organizations.

By way of a specific example, an energy aggregator organization may use the organization marketplace module 846 to post an offer that states that it will pay a certain amount a month for each station that it receives demand response rights for. An organization that owns charging stations may view the offer and accept the offer.

As another example, an organization that has charging stations that are used during the day (e.g., by employees during the workday) but are not typically used at night, may offer configuration rights over those stations at night for a fee. An organization accepting the offer (e.g., a fleet owner that would benefit from use of those charging stations to charge their fleet of electric vehicles) may configure those stations such that it will have access to use those stations.

As yet another example, a maintenance and support organization may make an offer to physically maintain failures for a fee, where the maintenance may require rights such as provisioning rights.

Private Affiliation Offers

As described above, affiliation offers may be extended publically (visible to anyone) and/or extended privately (visible only to certain electric vehicle operator(s)). In one embodiment, an organization may configure their affiliation offer to be either public or private. If private, the organization may communicate to certain electric vehicle operator(s) a code (sometimes referred herein as a secret affiliation code) that an electric vehicle operator must input in order to view the affiliation offer. The communication of the secret affiliation code may be outside of the charging network service (e.g., through email, text message, phone call, mail, etc.) and/or through the charging network service (e.g., through private message on an account with the charging service). After entering a valid secret affiliation code, the corresponding affiliation offer may be displayed to the electric vehicle operator and the electric vehicle operator may accept the offer as previously described herein.

Figure 23:
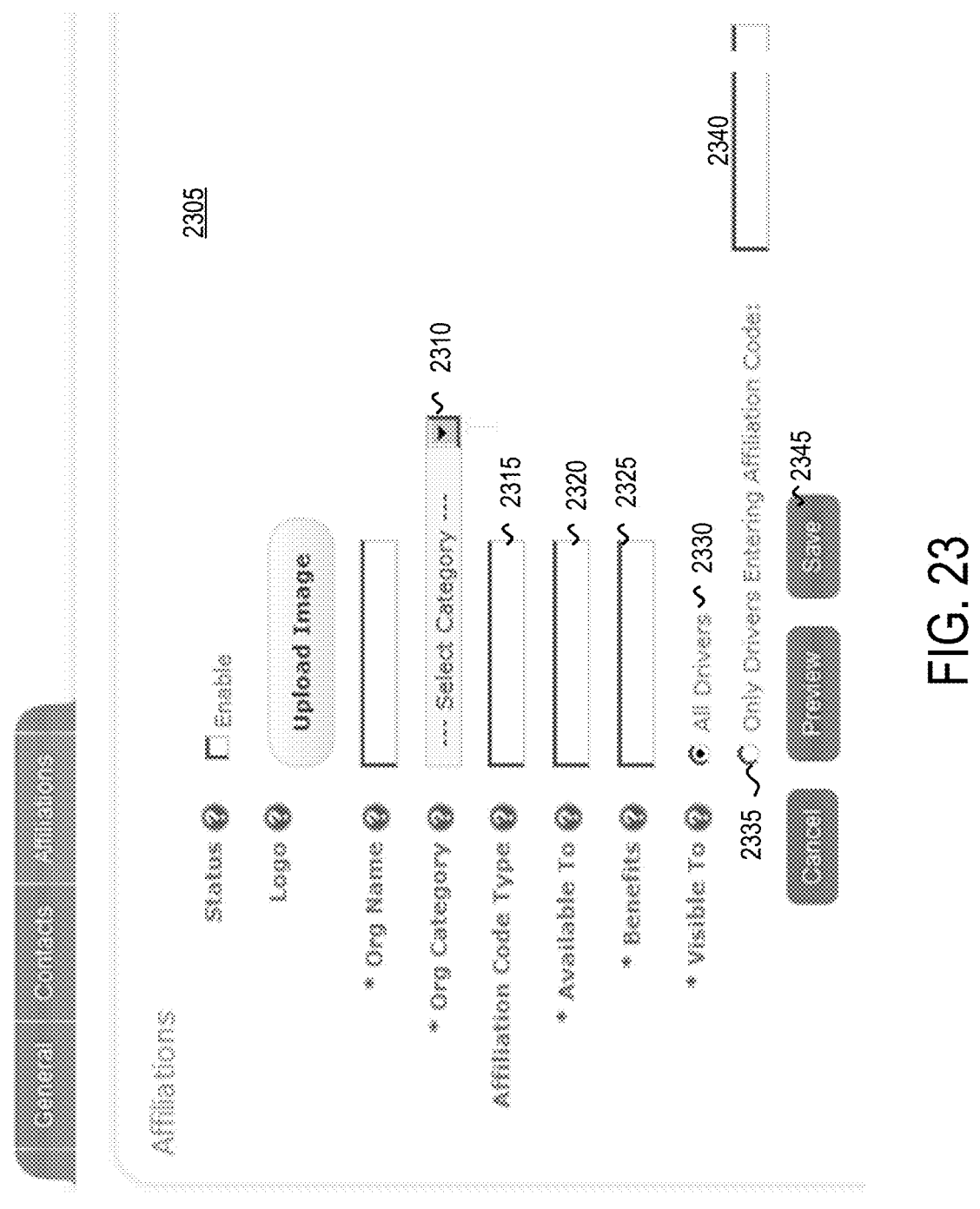

FIG. 23 illustrates an alternative exemplary interface to the affiliation definition module of FIG. 1 that allows organizations to define an affiliation group and indicate whether the affiliation offer will be visible to all electric vehicle operators or only those operators that enter in a secret affiliation code according to one embodiment. In one embodiment, the affiliation definition interface 2305 is a website that is available through the electric vehicle charging network service 105. In some embodiments, the affiliation definition interface 2305 is available only to organizations that are registered with the charging network service 105. In some embodiments, the affiliation definition interface 2305 (as well as other aspects of affiliation) are available only to those organizations that have purchased a package that includes affiliations (that is, in these embodiments the service 105 may require organizations to pay a fee for the ability to provide affiliations).

The affiliation definition interface 2305 allows organizations to define an affiliation group. The organization may select from the drop down field 2310 the category of the organization to specify the type of organization. Example organization categories include employer, restaurants, retail, hospitality, entertainment, parking garage, education, service providers, multi-dwelling units (e.g., apartments), municipalities, etc. In one embodiment, when viewing affiliation offers, electric vehicle operators may restrict or filter the affiliation offers based on a category.

The organization may specify the affiliation code type in the field 2315 (which is similar to the affiliation custom field name 210), which defines the value that the electric vehicle operator specifies and is used during a verification process (this field is sometimes referred herein as the verification field). By way of example, the affiliation code type may be an employee identifier. Thus, when an offer is extended to an electric vehicle operator, the electric vehicle operator will be asked to provide their employee number. Other examples include a university or school requiring a student identification number, a loyalty program (e.g., hospitality, travel) requiring a frequent flier or rewards program identifier, a retailer requiring a rewards program number, and a utility requiring an account number. It should be understood that these are examples, and the organizations may define different ways of identifying the electric vehicle operators. In addition, other embodiments may provide mechanisms for organizations to request more than one verification field.

The organization also specifies who the affiliation is available to using the field 2320. For example, an organization may specify that the affiliation is available only to employees of that organization. The organization may also specify the benefits of the affiliation using the field 2325 (e.g., access to the organization's charging stations).

The organization also specifies who can view the affiliation offer. For example, the organization may specify that all drivers may view the offer using the radio button 2330; or specify via the radio button 2335 that only the drivers that enter a certain secret affiliation code may view the offer. The organization may input the secret affiliation code using the field 2340.

The organization may submit the affiliation using the button 2345. Although FIG. 23 illustrates several different parameters for configuring affiliations, it should be understood that FIG. 23 is an example and affiliations may be configured with more parameters, less parameters, or different parameters.

Figure 24:
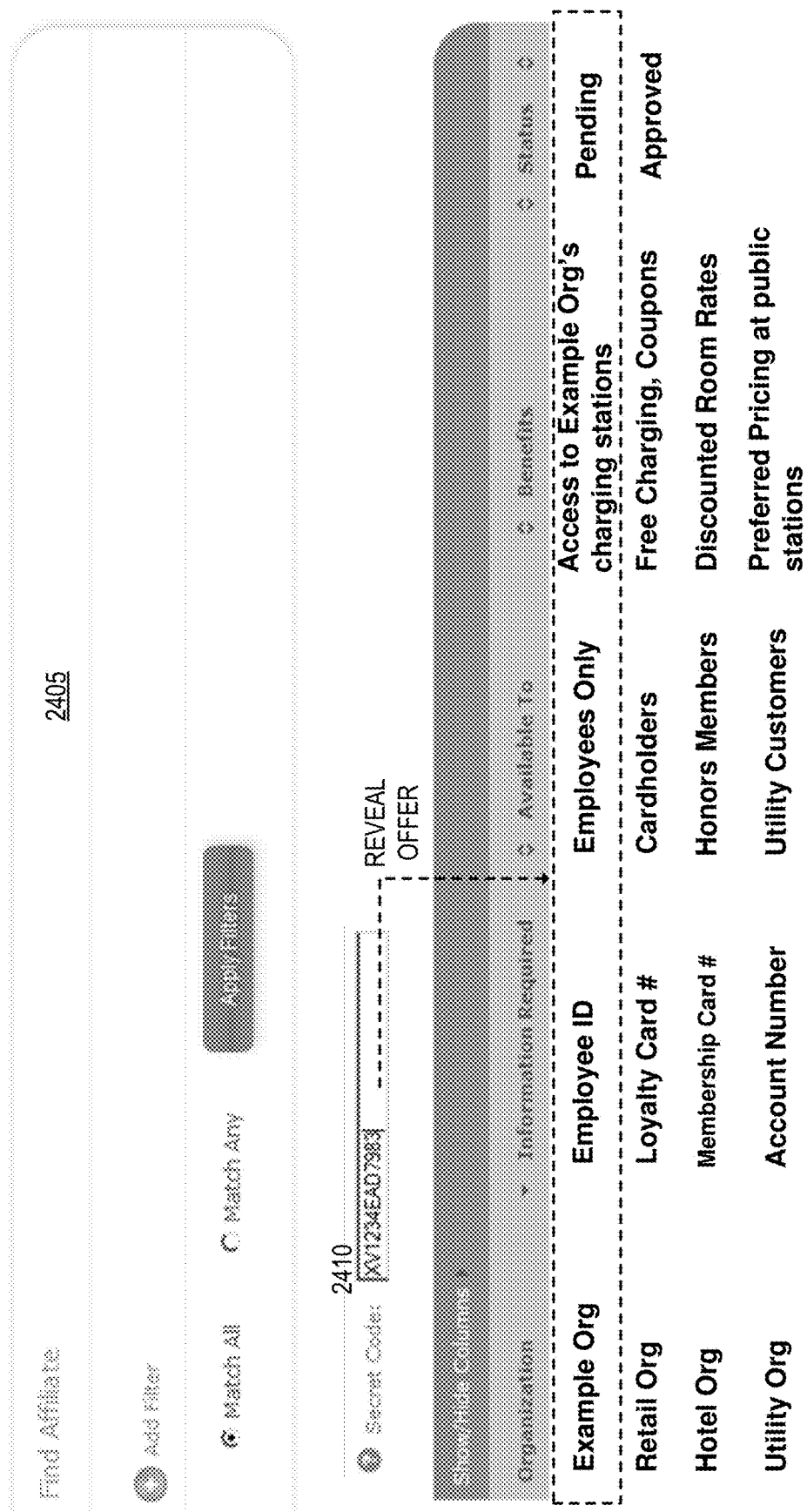
FIG. 24 illustrates an exemplary alternative interface of the affiliation module illustrated in FIG. 1 that allows electric vehicle operators to view and accept affiliation offers according to one embodiment.

In one embodiment, if an organization configures an affiliation offer as being visible only to electric vehicle operators that input a certain code, only those electric vehicle operators that input that code will be able to view the affiliation offer. FIG. 24 illustrates an exemplary alternative interface 2405 of the affiliation module 164 that allows electric vehicle operators to view and accept affiliation offers according to one embodiment. While in one embodiment the affiliation interface 2405 is a website that is available through the electric vehicle charging network service 105, in other embodiments the affiliation interface 2405 (or an interface equivalent to the interface 2405) is available through an application on a mobile device (e.g., a smartphone, a tablet, a notebook, etc.), via an in dash navigation system, via an application available through a social media portal, or through a display of a charging station.

The affiliation interface 2405 is similar to the affiliation interface 305, but it has the additional secret affiliation code field 2410 that allows an electric vehicle operator to input a secret affiliation code in order to view a private affiliation offer. For example, upon entering a valid secret affiliation code, the corresponding affiliation offer is displayed to the electric vehicle operator. For example, upon entering in the code illustrated in FIG. 24, the offer denoted within the dashed box is revealed to the electric vehicle operator. If the operator did not enter in the code, the offer denoted within the dashed box would not appear to the operator. The operator may accept the offer according to embodiments previously described herein. As similarly described above, in some embodiments, an accepted affiliation offer must be verified prior to it taking effect. In one embodiment, the verification process is similar to that as described above.

Object Use Granting

In some embodiments, an organization may grant object use privileges over certain EV charging object(s) to different organization(s). The organization granting the object use privileges manages the corresponding objects. The receiving organization can then use the granted objects to configure or manage their charging service, such as when configuring policies and/or stations for the charging service. Example EV charging object(s) that may be granted for use include an electric vehicle operator group that identifies certain electric vehicle operators (such as an employee group, a loyalty membership group, etc.), an electric vehicle group that identifies certain electric vehicles, a video that can be displayed on the charging stations, a set of one or more advertisements that can be displayed on the charging stations, time of use "hours" (e.g., days of week and hours of day, with holiday exceptions and seasonal adjustments), an access policy, a pricing rule, a demand response policy, a power ceiling profile, a waitlist policy, a charging station group, and a message for a charging station. A waitlist policy defines how a waitlist is implemented for use of one or more charging ports and/or charging stations. For instance, a waitlist may be used to put electric vehicle operators in priority to use a charging port and certain privileged user classes have priority queued in the waitlist (e.g., VIPs in a corporation) and the granting organization (e.g., corporate headquarters) wants the receiving organization (e.g., an affiliate or site) to honor the same policy. A demand response policy defines how demand response is to be implemented on one or more charging ports and/or charging stations, such as whether to change pricing in a demand response event (e.g., increase the price of service during a demand response event) and whether to throttle power in a demand response event.

By way of a specific example, an organization that manages an electric vehicle operator group (e.g., manages the electric vehicle operator group such as adding members to the group and removing members to the group) may grant the use of that electric vehicle operator group to another organization to use when configuring its service such as adding the electric vehicle operator group to an access policy applicable to one or more of its charging stations and/or adding the electric vehicle operator group to a pricing policy applicable to one or more of its charging stations.

In an embodiment, the object use granting is done by reference, meaning that the receiving organization has access to the current version of the object as its definition/ membership is changed by the granting organization. In such an embodiment, the receiving organization therefore does not need to manage, or even know, the membership of the granted EV charging objects. Any updates to the membership or definition of the granted EV charging objects will automatically apply to the use defined by the receiving organization. In another embodiment, the object use granting is a one-time copy of the object in its state at the time of the grant. In such an embodiment, any updates to the membership or definition of the granted EV charging objects by the granting organization does not automatically apply to the use defined by the receiving organization.

In an embodiment, the granting organization may grant the EV charging object(s) with different read-only/write/ view privileges. For instance, if granted with full privileges, the receiving organization can use the granted EV charging object(s) as well has delete, add, or modify the properties and/or membership of the granted EV charging object(s). As another example, if granted with read-only by object name, the receiving organization can only read and use the object name and cannot view or edit the properties nor membership of the granted EV charging object(s). For instance, if the granted object is an EV operator group with read-only by object name privileges, the receiving organization does not have access to the membership of the EV operator group and cannot remove or add any members to the EV operator group. As another example, if granted with view privileges, the receiving organization can use the granted EV charging object as well as view the membership of the EV charging objects, but cannot modify the EV charging objects.

Object use granting may be used, for example, in a shared commercial office park. For instance, the granting organization (e.g., a tenant of the shared commercial office park) may maintain in the system an electric vehicle operator group that represents their employees; and the receiving organization (e.g., the commercial real estate organization that owns or manages the shared commercial office park) may manage or own one or more charging stations at that shared commercial office park. After the granting organization grants use of the electric vehicle operator group to the receiving organization, the receiving organization may then use that electric vehicle operator group when configuring the charging service at the charging stations such as in an access policy and/or a pricing policy.

As another example, object use granting may be used by a company that has multiple organizations, sectors, or departments (or other organizational entity) that each desires to maintain their own electric vehicle operator group but also would like those groups to be usable by multiple organizations. As another example, a rental organization (or EV fleet organization) can grant use of an electric vehicle operator group and/or an electric vehicle group that they manage to another organization such as a hotel organization that owns or operates a set of charging stations at that organization's premises. As another example, an organization may create a video object that can be displayed on a charging station and grant use of that video object for other organizations to play on their charging stations.

Figure 25:
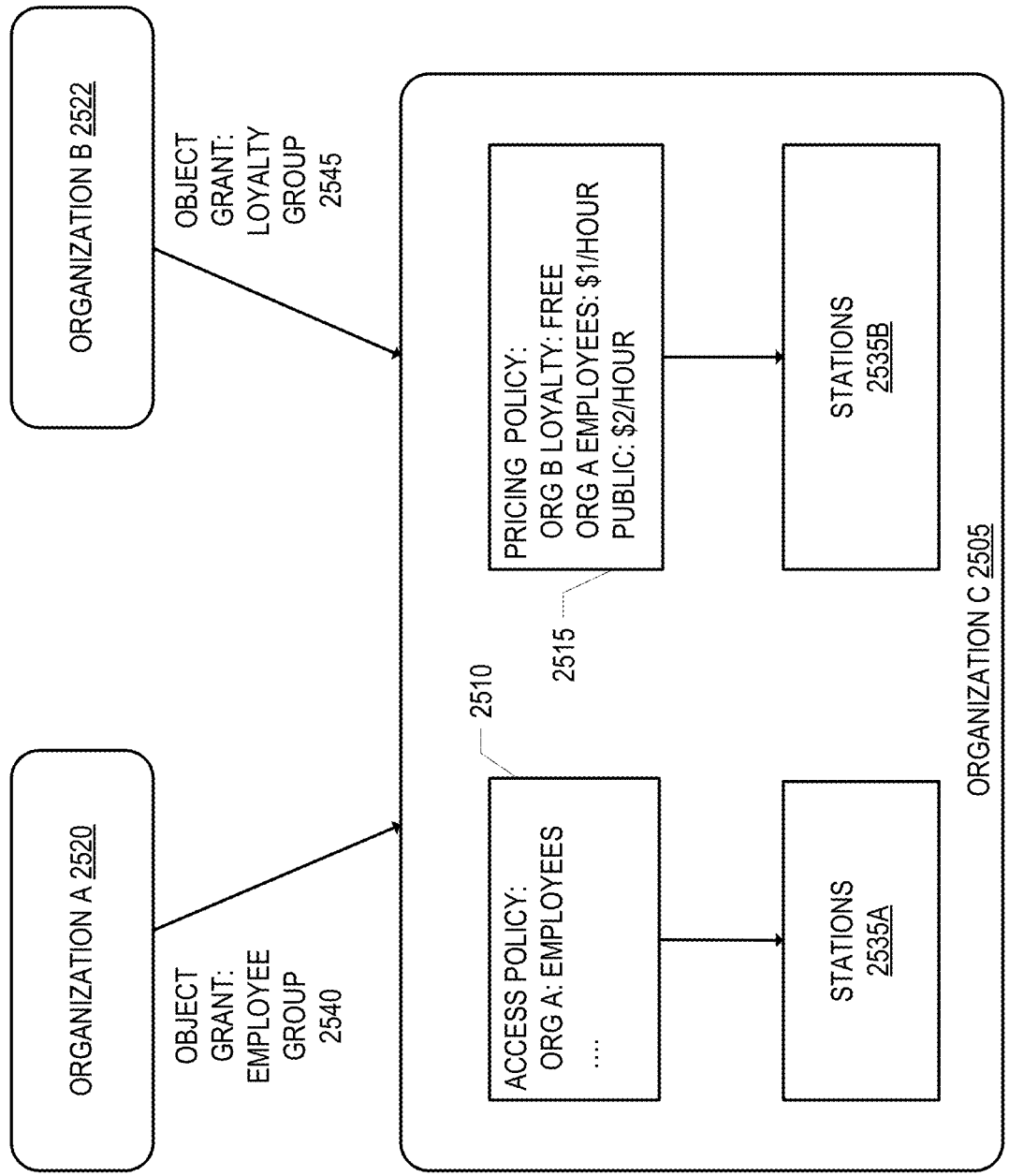
FIG. 25 illustrates an example of object use granting according to one embodiment.

FIG. 25 illustrates an example of object use granting according to one embodiment. The organization A 2520 and the organization B 2522 each grant different object use privileges to the organization C 2505. The organization A 2520 grants use of the employee group object 2540 to the organization C 2505. The employee group object 2540 may represent the employee group of organization A and is managed by the organization A 2520 including adding and removing employees to the employee group. The organization B 2522 grants use of the loyalty group object 2545 to the organization C 2505. The loyalty group object 2545 may represent the members of a loyalty program with the organization B 2522 and is managed by the organization B 2522. The organization C 2505 owns or maintains the charging stations 2535A and 2535B. The organization C 2505 receives the granted use of the employee group 2540 and the loyalty group 2545 and may use those groups in configuring its service such as in an access policy and/or a pricing policy. For example, FIG. 25 illustrates the organization C 2505 adding organization A's granted employee group 2540 to the access policy 2510 that is applied to the stations 2535A; adding organization B's granted loyalty group 2545 to a pricing rule of the pricing policy 2515 that is applied to the stations 2535B and setting the price to be free; and adding organization A's granted employee group 2540 to a pricing rule of the pricing policy 2515 and setting the price to be $1/hour.

Figure 26:
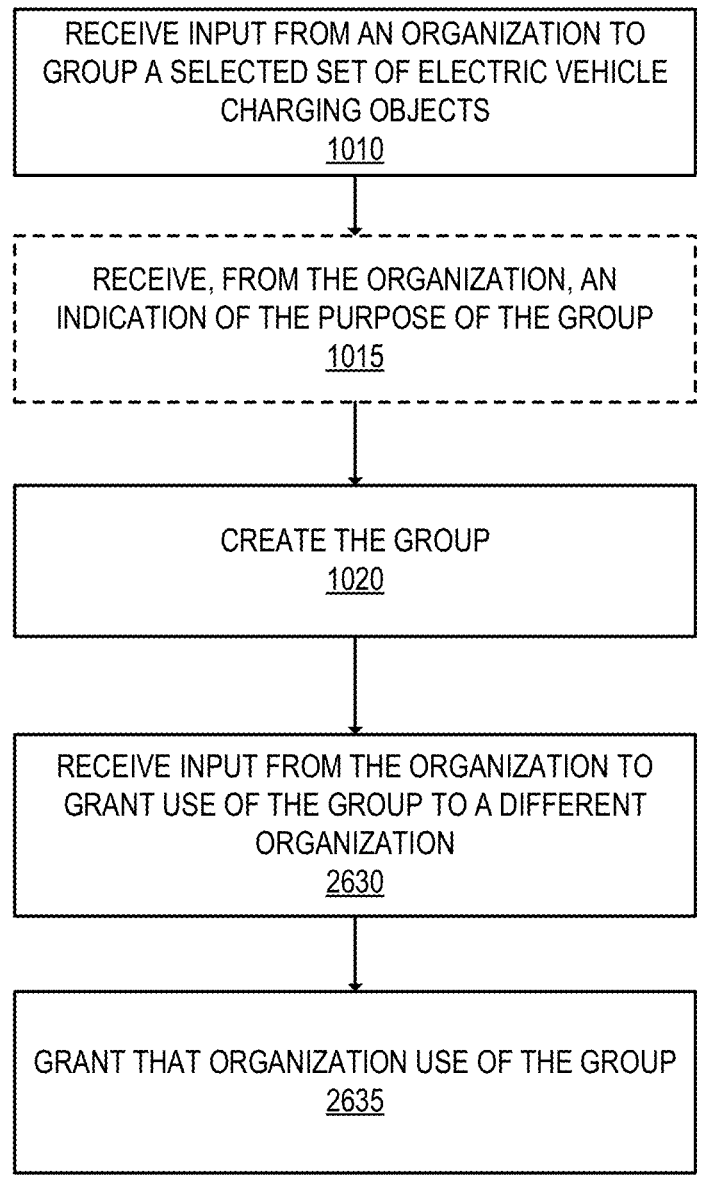
FIG. 26 is a flow diagram that illustrates exemplary operations for granting object use privileges to another organization according to one embodiment.

FIG. 26 is a flow diagram that illustrates exemplary operations for granting object use privileges to another organization according to one embodiment. The operations of FIG. 26 include the operations 1010-1020 previously described herein. However, it should be understood that different operations may be performed to create an EV charging object group.

After creating the group, flow moves to operation 2630 where input is received from the organization to grant use of the group to a different organization. For example, the object use granting module 845 receives input from the organization to grant use of one or more EV charging object groups. In an embodiment, the granting organization may provide input to set the read/write/view privileges of the granted EV charging object group. Prior to receiving input from the granting organization to grant use of the group to a different organization, the receiving organization may make a request through the service to the granting organization for use of their EV charging object; and in other embodiments the granting organization may make an offer through the service to the receiving organization for use of their EV charging object that the receiving organization must accept prior to granting use of the group to the receiving organization.

Figure 27:
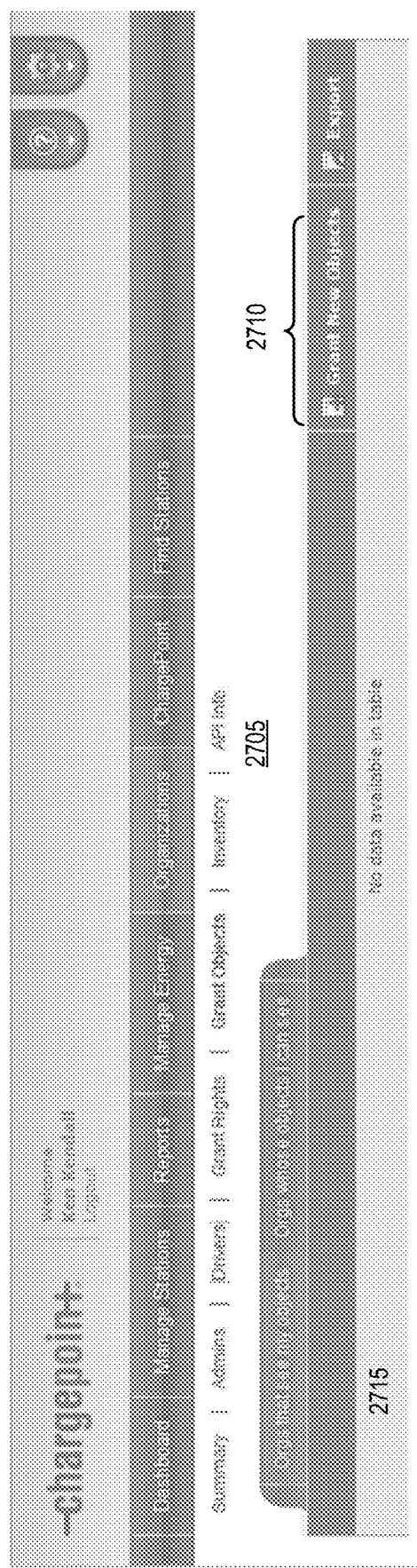
FIG. 27 illustrates an exemplary interface to the object use granting module that allows an administrator of an organization to grant object use privileges to another organization according to one embodiment.
Figure 29:
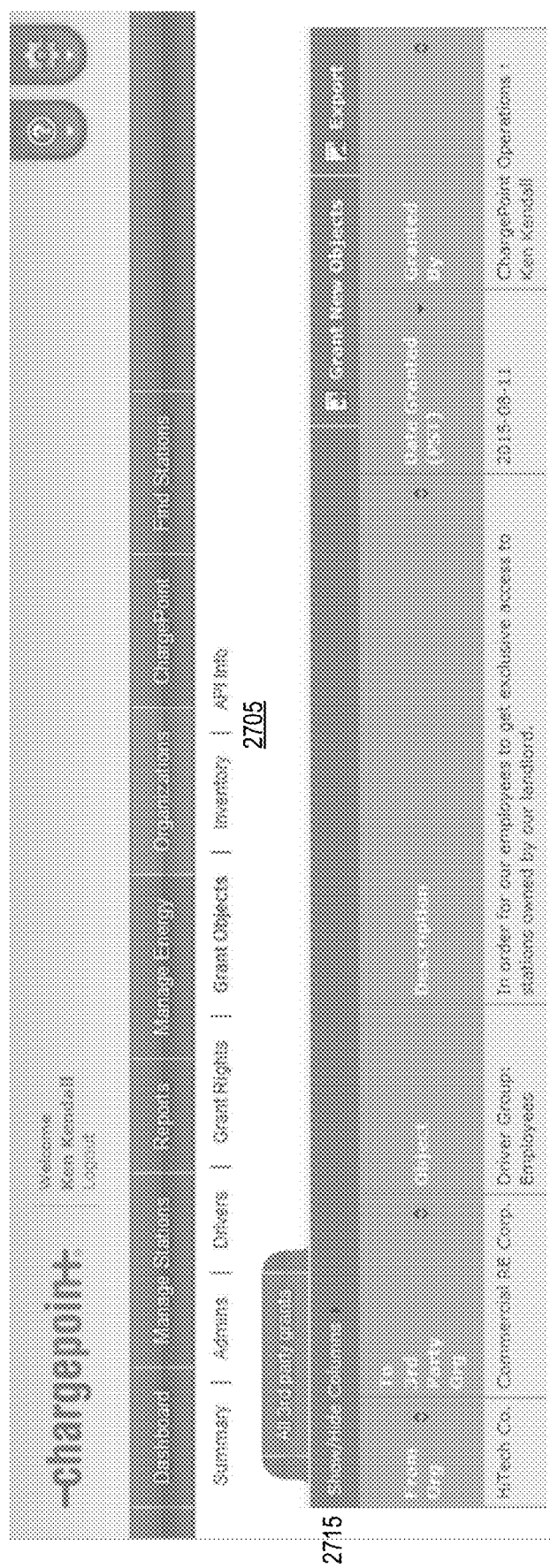
FIG. 29 shows the interface of FIG. 27 after an organization has been granted object use privileges according to one embodiment.

FIG. 27 illustrates an exemplary interface 2705 to the object use granting module 845 that allows an administrator of an organization to grant object use privileges to another organization according to one embodiment. The object use grant interface 2705 may be a web interface that is available through the charging network service 805 or an application (e.g., a mobile application) that is networked with the charging network service 805; and may be available only to organizations that are registered for the service. The interface 2705 shows the third party organization that may use the objects of the organization in the table 2715. As illustrated in FIG. 27, there are no third party organizations that may use the objects of the organization. FIG. 29 shows the interface 2705 after an organization has been granted object use privileges.

Figure 28:
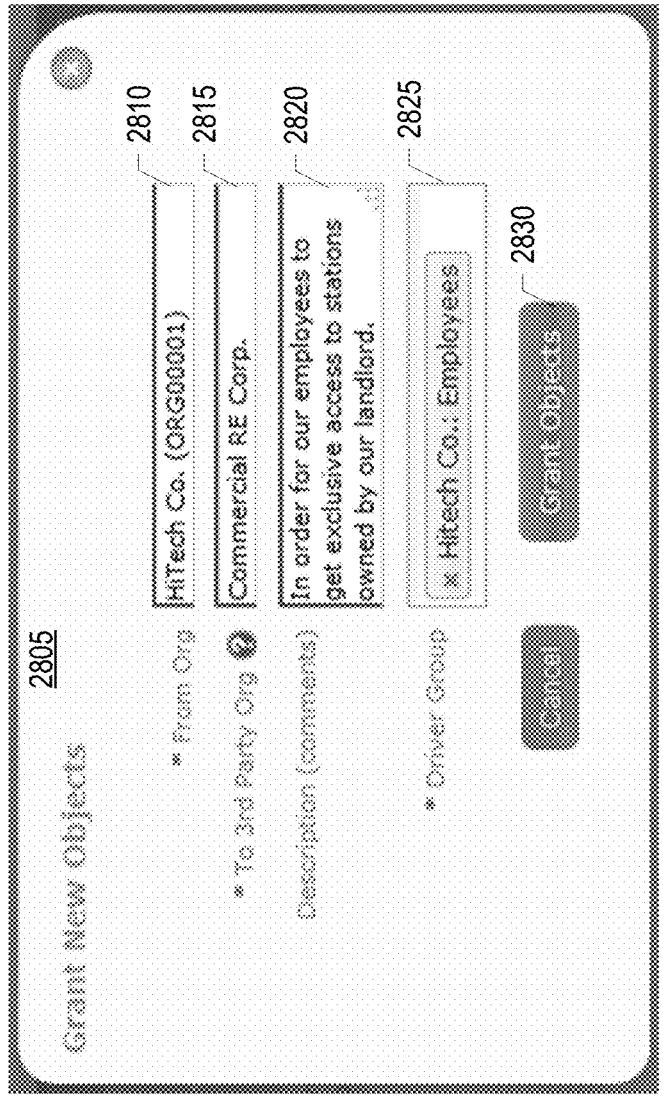
FIG. 28 illustrates an interface that is displayed when a link of the interface of FIG. 27 is selected according to one embodiment.

The interface 2705 includes a link 2710 that, when selected, causes an interface to be displayed that allows the administrator to grant object use privileges to an organization. For example, FIG. 28 illustrates an interface 2805 that is displayed when the link 2710 is selected. The interface 2805 includes a "From" field 2810 that allows the administrator to specify the organization that is granting the object use rights (e.g., by name or identifier). In an embodiment, the "From" field 2810 is automatically populated by the system depending on the administrator that is logged into the service. The interface 2805 includes a "To" field 2815 that allows the administrator to specify the third party organization that is the recipient of the granted object use rights (e.g., by name or identifier). The interface 2805 includes a "Description" field 2820 that allows the administrator to provide a reason or comments regarding the object use privileges being granted. The interface 2805 includes an object group field 2825 that allows the administrator to specify one or more object groups that will be granted to the receiving organization. The object group may have been created by the administrator in a similar way as previously described herein. The interface 2805 includes a grant objects button 2830 which, when selected, causes the object use privileges to be granted accordingly. Referring to FIG. 29, the table 2715 shows that the third party organization "Commercial RE Corp." may use the object "Driver Group: Employees" of the organization "HiTech Co.", as defined through the interface 2805. Of course, it should be understood that the interface 2705 is exemplary and different interfaces may be used to allow for different objects to be granted.

Referring back to FIG. 26, flow moves from operation 2630 to operation 2635 where use of that group is granted to the different organization. That receiving organization may then use that group to configure or manage their charging service. For example, the receiving organization can add that group to an access policy and apply it to one or more of its charging stations and/or add that group to a pricing policy (and set the price applicable for that group) and apply it to one or more of its charging stations. In an embodiment where the receiving organization has read-only by object name privileges, membership of the granted group is maintained by the granting organization. In an embodiment where the receiving organization has write privileges over the granted group, the receiving organization may add members to the granted group and/or delete members from the granted group.

In an embodiment where the object use granting is done by reference, any changes to the membership of the group is automatically applied to any settings that have been configured by the receiving organization. For instance, consider an example where the granted object represents an employee list of the granting organization, and the receiving organization has included the granted object on an access control list that is applied one or more stations of the receiving organization to allow the employees of the granting organization to be able to use the charging stations of the receiving organization. When a new employee is added to the employee list by the granting organization, that employee will be automatically and transparently able to use the charging stations of the receiving organization. When an employee is removed from the employee list by the granting organization, that employee will automatically and transparently lose the ability to use the charging stations of the receiving organization (assuming that the employee does not have access to the charging stations by another way).

Figure 30:
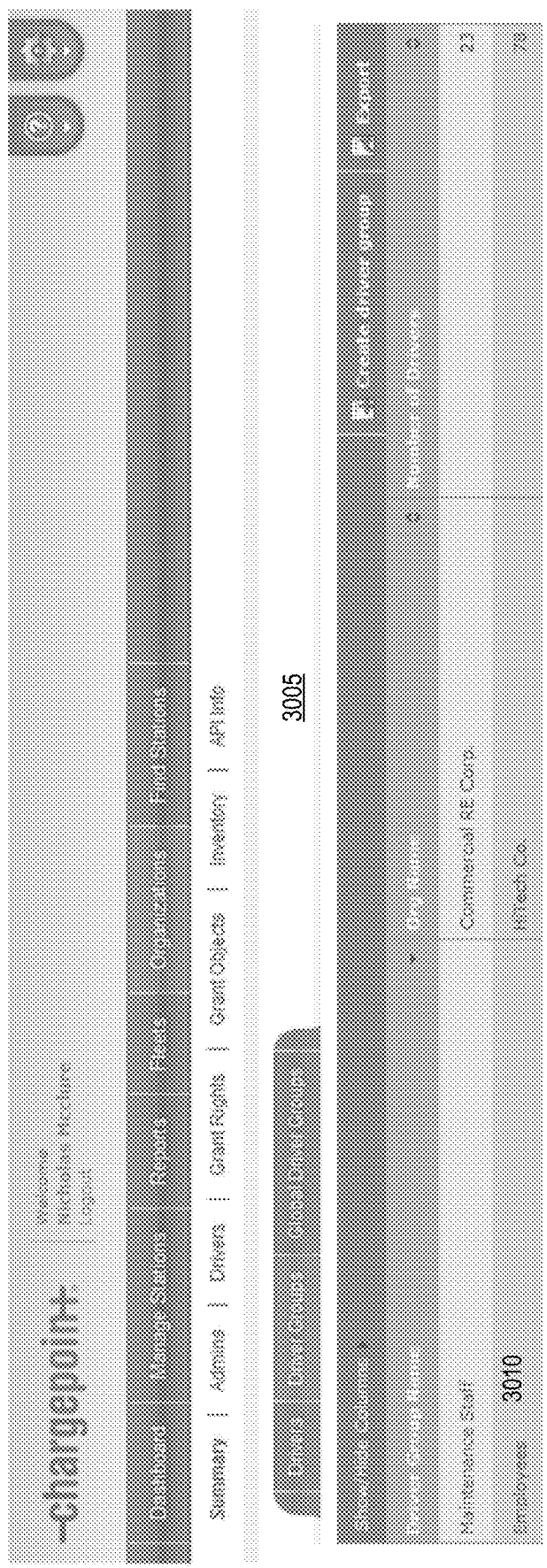
FIG. 30 illustrates an exemplary interface that shows the electric vehicle operator groups that are available to be used by the administrator being logged in according to one embodiment.

FIG. 30 illustrates an exemplary interface 3005 that shows the electric vehicle operator groups that are available to be used by the administrator being logged in. It should be noted that another organization (in this example "HiTech Co.") has granted use of the electric vehicle operator group 3010 to the administrator.

Figure 31:
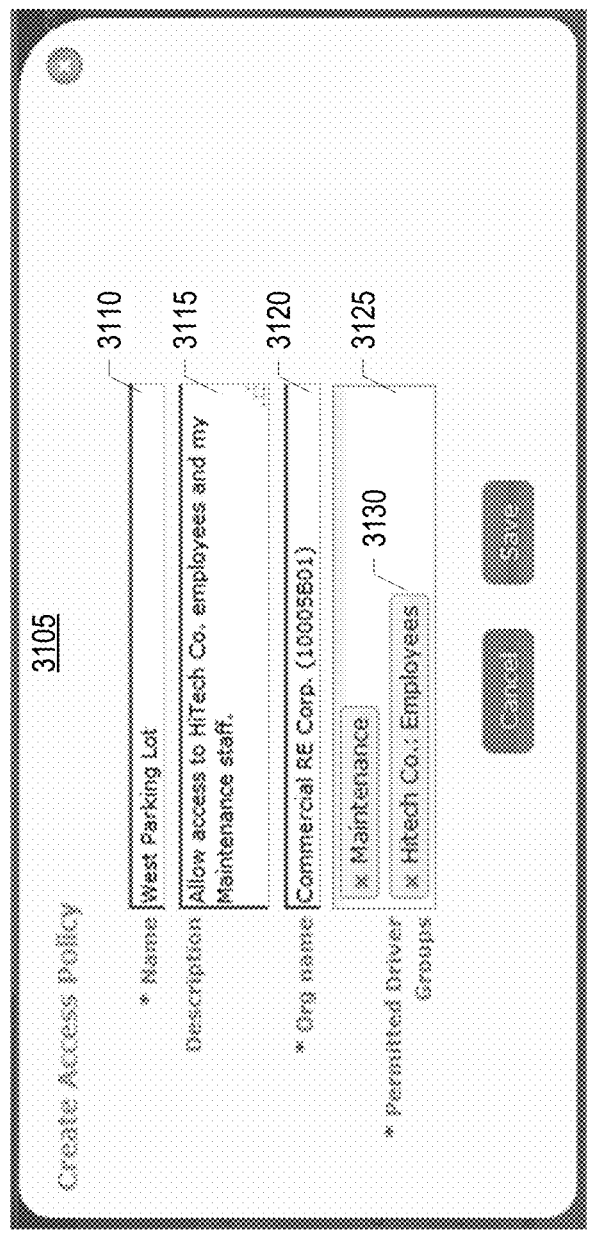
FIG. 31 illustrates an interface that allows the administrator to define an access policy according to one embodiment.

FIG. 31 illustrates an interface 3105 that allows the administrator to define an access policy according to one embodiment. The interface 3105 includes a name field 3110 that allows the administrator to give the access policy a name. The interface 3105 includes a description field 3115 that allows the administrator to give a description of the access policy. The interface 3105 includes an organization name field 3120 that allows the administrator to specify the organization in which this policy is applicable which may be prefilled depending on the administrator's privilege level. The interface 3105 includes the permitted electric vehicle operator groups field 3125 that allows the administrator to specify one or more electric vehicle operator groups that are allowed access under this access policy. The electric vehicle operator group 3130 is a third party group that has been granted by a third party organization.

Figure 32:
FIG. 32 illustrates an interface that allows the administrator to apply the access policy to one or more charging stations according to one embodiment.

After defining the access policy, the access policy can be applied to one or more stations. For instance, FIG. 32 illustrates an interface 3205 that allows the administrator to apply the access policy to one or more charging stations. As illustrated in FIG. 32, the interface 3205 includes a drop down list 3215 that is populated with the names of the created access policies that can be used to define which electric vehicle operators are allowed to use the group of charging stations 3210. The interface 3205 includes a drop down list 3220 that is populated with the names of the created access policies that can be used to define which electric vehicle operators are allowed to view the group of charging stations 3210 on a charging station locator application (such as an interactive map on a website).

In an embodiment, although the receiving organization can use a granted EV charging object group in their service, that receiving organization does not have access to the membership of that group (e.g., the receiving organization has read-only by object name privilege to the granted RV charging object group). As an example, when an organization "HiTech Co." grants an Employees electric vehicle operator group object to an organization "Real Estate Co.", Real Estate Co. can only see the name of the group and optionally the total number of members of the group, but cannot view the individual members of the group. That is the privacy of the identities of the individual employees on the granted group is maintained.

After an access policy is applied to a charging station, requests to use that charging station will use that access policy. Each request is associated with an access identifier as previously described herein. When a request is received to use a charging station that has an applied access policy, that access policy is used to determine whether to grant the request and allow charging service based on the access identifier associated with the request. In some cases, there may be multiple access policies applied to a charging station. In such a case, upon determining that the access identifier of a request satisfies at least one access policy, the request can be granted.

After a pricing policy is applied to a charging station, charging service for that charging station uses that pricing policy. For instance, when a request is received to use a charging station that has an applied pricing policy, the pricing policy is used to determine the pricing that will apply for the charging service. In some cases, there may be multiple pricing rules included in a pricing policy that are applied to a charging station. In such a case, in one embodiment the administrator defines a priority order for the pricing rules and the first matching pricing rule is used. In another embodiment, if there are multiple matching pricing rules (e.g., the access identifier is represented on multiple electric vehicle operator groups assigned to multiple pricing rules of the pricing policy) the service determines which pricing rule has a best price (typically the cheapest price) and uses that pricing rule.

In an embodiment, the service includes a reporting capability that can be used by the granting organization and/or the receiving organization. For instance, if the granted EV charging object is an EV operator group, the service may include a usage reporting capability that can be filtered by granted EV charging object that may allow, for example, the granting organization and/or the receiving organization to see how much energy was used by EV operators of the EV operator group. The organizations may use such a report to reconcile any financial arrangement between the organizations.

Figure 33:
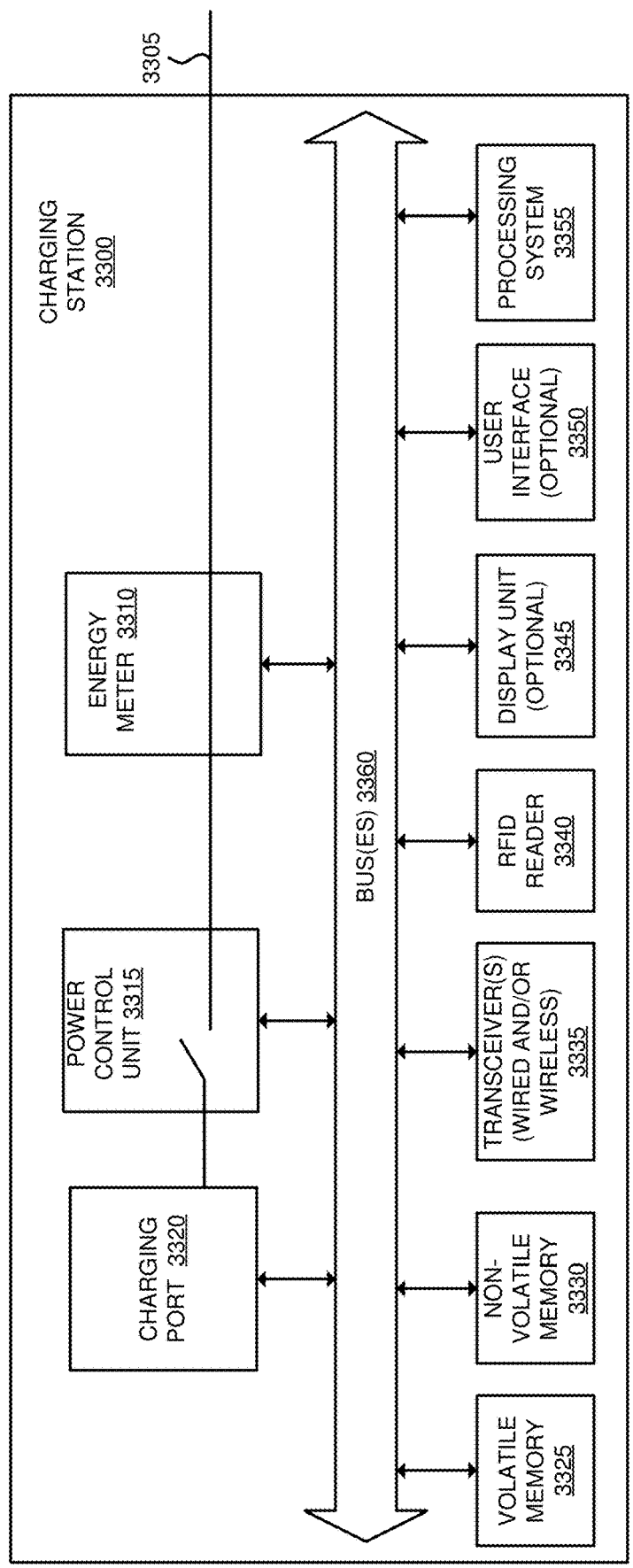
FIG. 33 illustrates an exemplary embodiment of a charging station according to one embodiment.

FIG. 33 illustrates an exemplary embodiment of a charging station according to one embodiment of the invention. It should be understood that FIG. 33 illustrates an exemplary architecture of a charging station, and other, different architectures may be used in embodiments of the invention described herein. For example, one or more of the components illustrated in FIG. 33 may not be included in some embodiments.

As illustrated in FIG. 33, the charging station 3300 includes the energy meter 3310, the power control unit 3315, the charging port 3320, the volatile memory 3325, the non-volatile memory 3330 (e.g., hard drive, flash, PCM, etc.), one or more transceiver(s) 3335 (e.g., wired transceiver(s) such as Ethernet, power line communication (PLC), etc., and/or wireless transceiver(s) such as 802.15.4 transceivers (e.g., ZigBee, etc.), Bluetooth, WiFi, Infrared, GPRS/GSM, CDMA, etc.), the RFID reader 3340, the display unit 3345, the user interface 3350, and the processing system 3355 (e.g., one or more microprocessors and/or a system on an integrated circuit), which are coupled with one or more buses 3360.

The energy meter 3310 measures the amount of electricity that is flowing on the power line 3305 through the charging connection 3320. While in one embodiment of the invention the energy meter 3310 measures current flow, in an alternative embodiment of the invention the energy meter 3310 measures power draw. The energy meter 3310 may be an induction coil or other devices suitable for measuring electricity. The energy meter 3310 may be used to take power samples.

The RFID reader 3340 reads RFID tags from RFID enabled devices (e.g., smartcards, key fobs, contactless credit cards, Near Field Communications in phones or tablets, etc.), embedded with RFID tag(s) of operators that want to use the charging station 3300. For example, in some embodiments a vehicle operator can wave/swipe an RFID enabled device near the RFID reader 3330 to request a charging session with the charging station 3300. It should be understood, however, that charging sessions may be requested in different ways and access identifiers may be presented to the charging station in different ways. For example, in some embodiments the electric vehicles communicate an access identifier (e.g., their VIN) to the charging station through a protocol (e.g., PLC). In such embodiments, the electric vehicle operator may not be required to present an access identifier (such as the RFID enabled device) to gain access to the charging station.

The transceiver(s) 3335 transmit and receive messages. For example, the transceiver(s) 3335 transmit authorization requests to the service, receive authorization replies from the service, transmit charging session data to the service, etc. The transceiver(s) 3335 may also receive affiliation offers (which may be displayed on the display unit 3345) and/or communicate acceptance of affiliation offers.

The display unit 3345 is used to display messages to vehicle operators including the price(s) for charging service, current cost for charging service, charging status, confirmation messages, error messages, notification messages, etc. The display unit 3345 may also display parking information if the charging station 3300 is also acting as a parking meter (e.g., amount of time remaining in minutes, parking violation, etc.). The display unit 3345 may also display affiliation offers.

The user interface 3340 (which is optional) allows users to interact with the charging station 3300. By way of example, the user interface 3350 allows electric vehicle operators to request charging sessions, pay for charging sessions, enter in account and/or payment information, view affiliation offers, accept affiliation offers, etc.

The processing system 3355 may retrieve instruction(s) from the volatile memory 3325 and/or the nonvolatile memory 3330, and execute the instructions to perform operations as described above.

Figure 34:
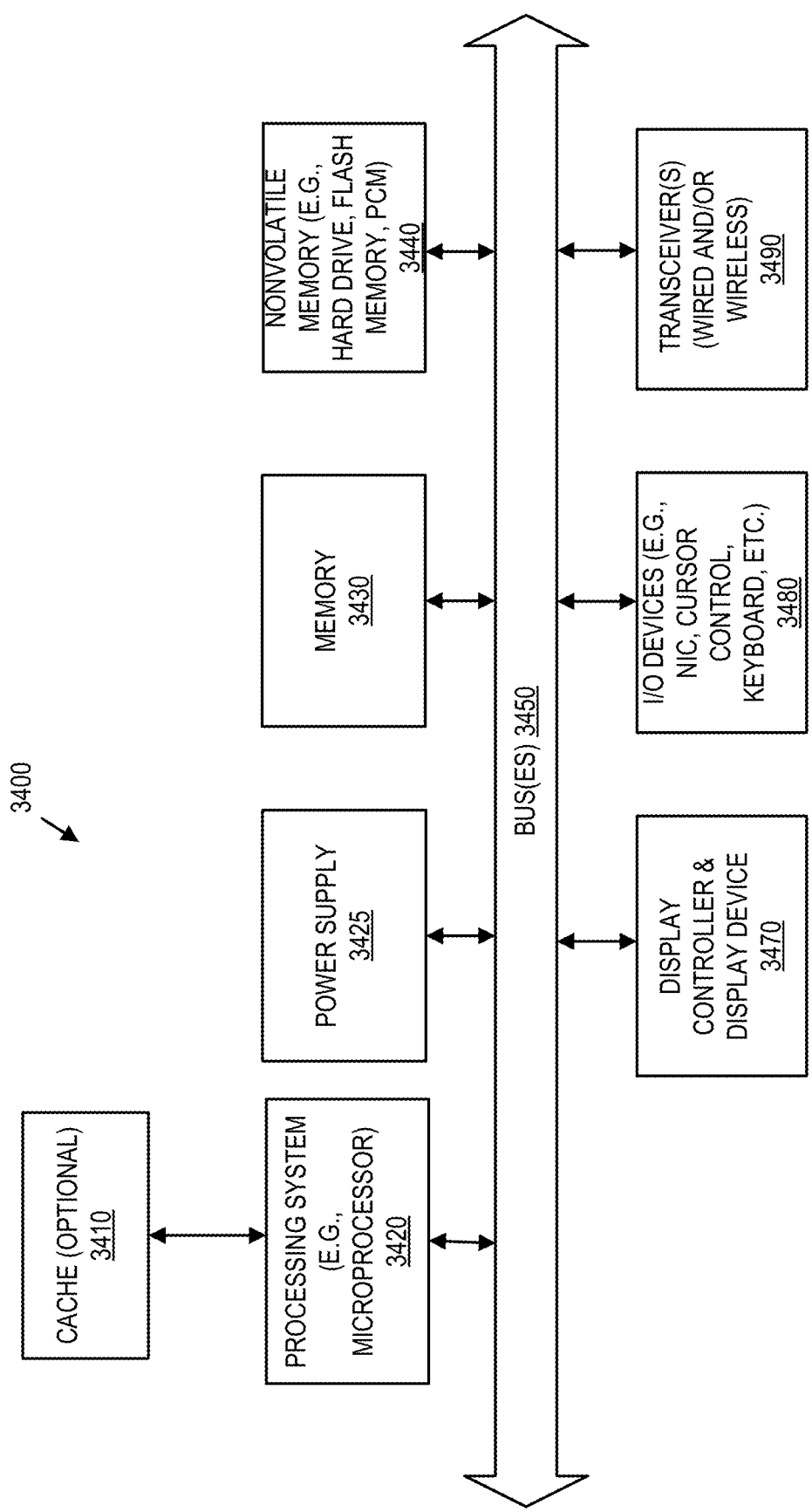
FIG. 34 is a block diagram illustrating an exemplary architecture of a data processing system that may be used in some embodiments.

FIG. 34 is a block diagram illustrating an exemplary architecture of a data processing system that may be used in some embodiments. It should be understood that while FIG. 34 illustrates various components of a data processing system, it is not intended to represent any particular architecture or manner of interconnecting the components as such details are not germane to the present invention. The architecture of the data processing system illustrated in FIG. 34 may be used by one or more servers of the service 105 and/or 805 described herein. It will be appreciated that other data processing systems of the service 105 and/or 805 may have fewer components or more components and may also be used with the present invention.

As illustrated in FIG. 34, the data processing system 3400, which is a form of a computing device, includes the bus(es) 3450 which is coupled with the processing system 3420, power supply 3425, memory 3430, and the nonvolatile memory 3440 (e.g., a hard drive, flash memory, Phase-Change Memory (PCM), etc.). The bus(es) 3450 may be connected to each other through various bridges, controllers, and/or adapters as is well known in the art. The processing system 3420 may retrieve instruction(s) from the memory 3430 and/or the nonvolatile memory 3440, and execute the instructions to perform operations as described above. The bus 3450 interconnects the above components together and also interconnects those components to the display controller & display device 3470, Input/Output device(s) 3480 (e.g., NIC (Network Interface Card), a cursor control (e.g., mouse, touchscreen, touchpad, etc.), a keyboard, etc.), and the transceiver(s) 3335 (wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, RFID, etc.)).

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   creating an electric vehicle operator group that includes a plurality of access identifiers associated with a plurality of electric vehicle operators of a first organization;
   granting use of the created electric vehicle operator group to a second organization, wherein the first organization and the second organization are different;
   adding the electric vehicle operator group to an access policy;
   applying the access policy to one or more electric vehicle charging stations owned or managed by the second organization to allow charging service at the one or more electric vehicle charging stations to the plurality of electric vehicle operators of the first organization; and
   wherein the first organization manages membership of the electric vehicle operator group.

2. The method of claim 1, wherein the second organization does not have access to view the plurality of access identifiers.

3. The method of claim 1, further comprising;
   receiving a request to use one of the one or more electric vehicle charging stations, wherein the request includes an access identifier; and
   determining, using the access policy, whether to authorize charging based on the access identifier included in the request.

4. The method of claim 1, wherein prior to creating the electric vehicle operator group, performing the following:
   receiving, from a first one of the plurality of electric vehicle operators, a secret affiliation code;
   responsive to determining that the secret affiliation code is valid and corresponds with an affiliation offer, extending that affiliation offer to the first electric vehicle operator;
   receiving, from the first electric vehicle operator, an acceptance of the affiliation offer,
   responsive to verifying that the first electric vehicle operator is allowed to be affiliated with the first organization, associating the first electric vehicle operator with the first organization.

5. The method of claim 4, wherein associating the first electric vehicle operator with the first organization includes adding an access identifier associated with the first electric vehicle operator to the electric vehicle operator group.

6. A non-transitory computer-readable storage medium that stores instructions that, when executed by a processor, cause said processor to perform the following operations;
   creating an electric vehicle operator group that includes a plurality of access identifiers associated with a plurality of electric vehicle operators of a first organization;
   granting use of the created electric vehicle operator group to a second organization, wherein the first organization and the second organization are different;
   adding the electric vehicle operator group to an access policy;
   applying the access policy to one or more electric vehicle charging stations owned or managed by the second organization to allow charging service at the one or more electric vehicle charging stations to the plurality of electric vehicle operators of the first organization; and
   wherein the first organization manages membership of the electric vehicle operator group.

7. The non-transitory computer-readable storage medium of claim 6, wherein the second organization does not have access to view the plurality of access identifiers.

8. The non-transitory computer-readable storage medium of claim 6 that further stores instructions that, when executed by the processor, cause said processor to perform further the operations:
   receiving a request to use one of the one or more electric vehicle charging stations, wherein the request includes an access identifier; and determining, using the access policy, whether to authorize charging based on the access identifier included in the request.

9. The non-transitory computer-readable storage medium of claim 6 that further stores instructions that, when executed by the processor, cause said processor to perform further the operations prior to creating the electric vehicle operator group:
receiving, from a first one of the plurality of electric vehicle operators, a secret affiliation code;
responsive to determining that the secret affiliation code is valid and corresponds with an affiliation offer, extending that affiliation offer to the first electric vehicle operator;
receiving, from the first electric vehicle operator, an acceptance of the affiliation offer,
responsive to verifying that the first electric vehicle operator is allowed to be affiliated with the first organization, associating the first electric vehicle operator with the first organization.

10. The non-transitory computer-readable storage medium of claim 9, wherein associating the first electric vehicle operator with the first organization includes adding an access identifier associated with the first electric vehicle operator to the electric vehicle operator group.

11. An apparatus, comprising:
a processor;
a non-transitory computer-readable storage medium coupled with the processor that stores instructions that, when executed by the processor, cause said apparatus to:
create an electric vehicle operator group that includes a plurality of access identifiers associated with a plurality of electric vehicle operators of a first organization;
grant use of the created electric vehicle operator group to a second organization, wherein the first organization and the second organization are different;
add the electric vehicle operator group to an access policy;
apply the access policy to one or more electric vehicle charging stations owned or managed by the second organization to allow charging service at the one or more electric vehicle charging stations to the plurality of electric vehicle operators of the first organization; and
wherein the first organization manages membership of the electric vehicle operator group.

12. The apparatus of claim 11, wherein the second organization does not have access to view the plurality of access identifiers.

13. The apparatus of claim 11, wherein the non-transitory computer-readable storage further stores instructions that, when executed by the processor, cause said apparatus to:
receive a request to use one of the one or more electric vehicle charging stations, wherein the request includes an access identifier; and
determine, using the access policy, whether to authorize charging based on the access identifier included in the request.

14. The apparatus of claim 11, wherein the non-transitory computer-readable storage further stores instructions that, when executed by the processor, cause said apparatus to perform the following prior to creation of the electric vehicle operator group:
receive, from a first one of the plurality of electric vehicle operators, a secret affiliation code;
responsive to a determination that the secret affiliation code is valid and corresponds with an affiliation offer, extend that affiliation offer to the first electric vehicle operator;
receive, from the first electric vehicle operator, an acceptance of the affiliation offer,
responsive to a verification that the first electric vehicle operator is allowed to be affiliated with the first organization, associate the first electric vehicle operator with the first organization.

15. The apparatus of claim 11, wherein association of the first electric vehicle operator with the first organization includes an addition of an access identifier associated with the first electric vehicle operator to the electric vehicle operator group.

16. The method of claim 1, wherein membership of the electric vehicle operator group cannot be modified by the second organization.

17. The non-transitory computer-readable storage medium of claim 6, wherein membership of the electric vehicle operator group cannot be modified by the second organization.

18. The apparatus of claim 11, wherein membership of the electric vehicle operator group cannot be modified by the second organization.

* * * * *